(12) United States Patent
Orabi et al.

(10) Patent No.: US 12,524,994 B1
(45) Date of Patent: Jan. 13, 2026

(54) ARTIFICIAL INTELLIGENCE SYSTEM AND METHOD FOR AUTOMATIC CONTENT DETECTION AND BLOCKING

(71) Applicant: Safetonet Limited, Reading (GB)

(72) Inventors: Ahmed Husseini Orabi, Ottawa (CA); Mahmoud Husseini Orabi, Ottawa (CA); Richard Pursey, Martlesham (GB); Ian Brown, Basingstoke (GB); Emily Nicholass, Canterbury (GB); Jack Pursey, Faversham (GB)

(73) Assignee: Safetonet Limited, Reading (GB)

( * ) Notice: Subject to any disclaimer, the term of this patent is extended or adjusted under 35 U.S.C. 154(b) by 0 days.

(21) Appl. No.: 19/288,486

(22) Filed: Aug. 1, 2025

Related U.S. Application Data

(60) Provisional application No. 63/763,545, filed on Feb. 26, 2025.

(51) Int. Cl.
*G06V 10/764* (2022.01)
*G06V 10/25* (2022.01)
(Continued)

(52) U.S. Cl.
CPC ............ *G06V 10/764* (2022.01); *G06V 10/25* (2022.01); *G06V 10/761* (2022.01); *G06V 10/774* (2022.01); *G06V 10/82* (2022.01)

(58) Field of Classification Search
CPC .... G06V 10/764; G06V 10/25; G06V 10/761; G06V 10/774; G06V 10/82
See application file for complete search history.

(56) References Cited

U.S. PATENT DOCUMENTS 8,949,878 B2 * 2/2015 Dimitrova .......... H04N 21/4542
725/28
9,009,779 B2   4/2015 Hegge et al.
(Continued)

OTHER PUBLICATIONS

Li et al., ("Automatic Text Detection and Tracking in Digital Video", IEEE Transaction on image processing, vol. 9, No. 1, Jan. 2000) (Year: 2000).*

(Continued)

*Primary Examiner* — Amara Abdi
(74) *Attorney, Agent, or Firm* — NEO IP

(57) ABSTRACT

An embedded artificial intelligence system for preventing exposure to, and the creation of, inappropriate content by automatically detecting and blocking harmful content, including self-generated content. The system includes a machine learning (ML) model, built on efficient vision transformer (EVT) architecture, wherein the EVT architecture is operable to balance high performance with low computational overhead, such that the system is operable to be embedded in the operating system of a device. The ML model is trained on a dataset including images, text descriptions, videos, audio and/or other multimedia content, wherein the dataset content includes neutral images and/or inappropriate images, including not safe for work (NSFW) images and illegal child sexual abuse material (CSAM). The system is operable to detect and block content being shown on a device, camera-captured content taken on a device, and/or camera-captured content broadcasted in real-time/livestreamed from a device.

24 Claims, 6 Drawing Sheets

(51) Int. Cl.
*G06V 10/74* (2022.01)
*G06V 10/774* (2022.01)
*G06V 10/82* (2022.01)

(56) References Cited

U.S. PATENT DOCUMENTS

| | | |
|---|---|---|
| 10,031,977 B1 | 7/2018 | Maycock |
| 10,349,126 B2 | 7/2019 | Yun et al. |
| 10,366,347 B2 | 7/2019 | Tofighbakhsh |
| 10,440,063 B1 | 10/2019 | Nevick et al. |
| 10,962,939 B1 | 3/2021 | Das et al. |
| 11,188,783 B2 * | 11/2021 | Cricrì .................... G06V 10/454 |
| 11,568,280 B1 | 1/2023 | Hermoni et al. |
| 11,736,769 B2 | 8/2023 | Khov et al. |
| 11,778,271 B2 | 10/2023 | Dhiman et al. |
| 11,856,260 B2 | 12/2023 | Holm et al. |
| 11,995,803 B1 * | 5/2024 | Karpman ................... G06T 5/70 |
| 12,063,415 B2 | 8/2024 | Dhiman et al. |
| 12,081,552 B2 | 9/2024 | Mitchell et al. |
| 2016/0099963 A1 * | 4/2016 | Mahaffey ............. H04L 63/166 |
| | | 726/25 |
| 2022/0132209 A1 | 4/2022 | Puri et al. |
| 2023/0162337 A1 * | 5/2023 | Korenwaitz .......... H04L 9/3247 |
| | | 382/260 |
| 2023/0177805 A1 | 6/2023 | Korenwaitz et al. |
| 2023/0281826 A1 * | 9/2023 | Schulter ................ G06V 10/761 |
| | | 382/173 |
| 2023/0376835 A1 * | 11/2023 | Malkiel ................. G06N 3/0895 |
| 2023/0410465 A1 * | 12/2023 | Su ....................... G06V 10/7715 |
| 2024/0071122 A1 * | 2/2024 | Ahl ........................ G06V 10/14 |
| 2024/0080524 A1 | 3/2024 | Steynfaardt et al. |
| 2024/0137614 A1 | 4/2024 | Holm et al. |
| 2024/0340537 A1 * | 10/2024 | Fortin-Deschenes ....................... |
| | | H04N 23/6812 |
| 2024/0371049 A1 * | 11/2024 | Hsu ....................... G06F 40/166 |
| 2024/0414394 A1 * | 12/2024 | Christensen ..... H04N 21/44008 |
| 2025/0232557 A1 * | 7/2025 | Osep ................... G06V 10/764 |

OTHER PUBLICATIONS

Jonathan et al., (CS-Mixer: A Cross-Scale Vision Multilayer Perceptron With Spatial-Channel Mixing), IEEE Transactions on artificial intelligence, vol. 5, No. 10, Oct. 2024) (Year: 2014).*

* cited by examiner

ARTIFICIAL INTELLIGENCE SYSTEM AND METHOD FOR AUTOMATIC CONTENT DETECTION AND BLOCKING

CROSS REFERENCES TO RELATED APPLICATIONS

This application is related to and claims priority from the following U.S. patent applications. This application claims priority to and the benefit of U.S. Provisional Application No. 63/763,545, filed Feb. 26, 2025, which is incorporated herein by reference in its entirety.

BACKGROUND OF THE INVENTION

1. Field of the Invention

The present invention relates to content control technology for children and vulnerable individuals, and more specifically to an artificial intelligence (AI) system for automatically detecting and blocking harmful content, including self-generated content.

2. Description of the Prior Art

It is generally known in the prior art to provide content control technology for children, including parental controls and content filtering.

Prior art patent documents include the following:

U.S. Pat. No. 11,856,260 for Applications, systems and methods to monitor, filter and/or alter output of a computing device by inventors Michael Holm et al., filed Mar. 30, 2017, and issued Dec. 26, 2023, is directed to a system for to monitor image input of a computing device having a control circuit with a programmable processor, and configured to receive images and to output the images to an image output device coupled to the computing device. The computing device can be configured to monitor the received images via the processor of the computing device being programmed using a Machine Learning Image Classification (MLIC) algorithm configured to determine a score of at least one received image within a predetermined criteria for classifying said at least one received image as a restricted subject image. Based on determination of the score, a modify or non-modify command is generated; and wherein in response to said at least one received image being scored by said processor within the modify criteria, the processor is programmed to generate a command to output the modified image.

US Patent Publication No. 2024/0137614 for Applications, systems, and methods to monitor, filter and/or alter output of a computing device by inventors Holm, et al., filed Dec. 20, 2023, and published Apr. 25, 2024, is directed to a system for to monitor image input of a computing device having a control circuit with a programmable processor, and configured to receive images and to output the images to an image output device coupled to the computing device. The computing device can be configured to monitor the received images via the processor of the computing device being programmed using a Machine Learning Image Classification (MLIC) algorithm configured to determine a score of at least one received image within a predetermined criteria for classifying said at least one received image as a restricted subject image. Based on determination of the score, a modify or non-modify command is generated; and wherein in response to said at least one received image being scored by said processor within the modify criteria, the processor is programmed to generate a command to output the modified image.

U.S. Pat. No. 11,736,769 for Content filtering in media playing devices by inventors Khov, et al., filed Apr. 12, 2021, and issued Aug. 22, 2023, is directed to various approaches relating to user defined content filtering in media playing devices of undesirable content represented in stored and real-time content from content providers. For example, video, image, and/or audio data can be analyzed to identify and classify content included in the data using various classification models and object and text recognition approaches. Thereafter, the identification and classification can be used to control presentation and/or access to the content and/or portions of the content. For example, based on the classification, portions of the content can be modified (e.g., replaced, removed, degraded, etc.) using one or more techniques (e.g., media replacement, media removal, media degradation, etc.) and then presented.

U.S. Pat. No. 10,031,977 for Data content filter by inventor Maycock, filed Apr. 27, 2017, and issued Jul. 24, 2018, is directed to a method, system and product for filtering out data content on a computing device that is integrated into the operating system of the computing device, comprising receiving, by the computing device and in response to a network request by an application, an object associated with content identifiers. The method, system and product further comprise determining, by the computing device and based on an indication of selected filter criteria, a respective weighted probability for the object, and determining, by the computing device, a graphical element for the application based on the weighted probabilities. The method, system and product further comprise outputting, by the computing device and at the graphical user interface of the computing device, the graphical element.

U.S. Pat. No. 10,366,347 for Methods, systems and devices for monitoring and controlling media content using machine learning by inventor Tofighbakhsh, filed Jun. 2, 2017, and issued Jul. 30, 2019, is directed to embodiments that comprise provisioning a target user profile and obtaining viewing history data. Further embodiments include generating a group of control rules according to the target user profile and training a machine learning application according to the viewing history data and the group of control rules. Additional embodiments include receiving a first indication that a first media content is to be presented to a target user. Also, embodiments include determining by the machine learning application, that the first media content does not conform to the group of control rules and providing a first notification that the first media content does not conform to the group of control rules.

US Patent Publication No. 2022/0132209 for Method and system for real time filtering of inappropriate content from plurality of video segments by inventors Puri, et al., filed Jan. 6, 2022, and published Apr. 28, 2022, is directed to a computer-implemented method and system for real-time filtering of an inappropriate content from a plurality of video segments. The method includes a first step of receiving multimedia content. In addition, the method includes another step of segmenting the multimedia content in real-time. Further, the method includes yet another step of identifying the inappropriate content in real-time. Furthermore, the method includes yet another step of filtering of the plurality of video segments in real-time. Moreover, the method includes yet another step of displaying an appropriate video content in real-time.

U.S. Pat. No. 9,009,779 for Methods related to network access redirection and control and devices and systems utilizing such methods by inventors Hegge, et al., filed Nov. 14, 2011, and issued Apr. 14, 2015, is directed to methods which utilize a thin kernel module operating in the kernel space of an operating system to redirect all TCP flows to user space for application analysis and processing. Redirected data is presented to the user space application as a data stream, allowing the processing of information contained within the data stream from the user space on a mobile device. This allows the user space application to inspect and take action on incoming data before allowing the data to continue to pass through the device. This enables parental controls, firewalls, real-time anti-virus scanning, tethering/hot-spot, bandwidth optimization, and similar programs to effectively operate across different mobile devices as user downloadable/actuatable applications.

U.S. Pat. No. 10,962,939 for Fine-grain moderation to restrict images by inventors Das, et al., filed May 26, 2017, and issued Mar. 30, 2021, is directed to customizable content moderation using neural networks with fine-grained and dynamic image classification ontology. A content moderation system of the present disclosure may provide a plurality of image categories in which a subset of image categories may be designated as restricted categories. The restricted categories may be chosen by a content provider or an end-user. The content moderation system may utilize a neural network to classify image data (e.g., still images, video, etc.) into one or more of the plurality of image categories, and determine that an image is a restricted image upon classifying the image into one of the restricted categories. The restricted image may by flagged, rejected, removed, or otherwise filtered upon being classified as a restricted image.

U.S. Pat. No. 10,440,063 for Media device content review and management by inventors Nevick, et al., filed Nov. 28, 2018, and issued Oct. 8, 2019, is directed to systems and methods to monitor media content on a monitored media device, including multimedia content, to determine whether the content is appropriate for the monitored device or devices, and to take action to remove, filter or otherwise block inappropriate content. The content monitored may include, for example, content such as audio content, video content, images, and text.

U.S. Pat. No. 12,081,552 for Personal awareness system and method for personal safety and digital content safety of a user by inventors Mitchell, et al., filed Mar. 8, 2022, and issued Sep. 3, 2024, is directed to a personal awareness system that provides a user physical health/wellness/welfare safety as well as online digital safety by blocking inappropriate digital content. The personal awareness system comprises a network protection appliance for use on a local area network (LAN), a software application that can be used on a mobile computing device, a cloud-based remote data processing resource to administer the system, and a monitor computing device that an observer can use to monitor, track, and receive alerts related to the user. The system can support many users individually as well as groups of users. In operation, sensors associated with the mobile computing device monitor the health, wellness, and location of the user and digital filter rules suppress inappropriate digital content from user access to provide digital safety. The mobile computing device can seamlessly transition between LAN environments and wireless mobile environments.

US Patent Publication No. 2024/0080524 for Method and system for redacting undesirable digital content by inventors Steynfaardt, et al., filed Jun. 21, 2023, and published Mar. 7, 2024, is directed to a method and system for redacting digital content. The system includes an identification server and an inspection engine. The server is configured to receive a content request originating from a user device and to identify a user account associated with the content request. The server is further configured to tag the content request with a restriction identifier which is indicative of a restriction level of a user of the user device. The engine is configured to analyze visual content forming part of digital content requested by way of the content request before the digital content is transmitted to the user device. A result of the analysis performed by the inspection engine is used to determine whether the visual content is undesirable based on the restriction parameter. If classified as undesirable, the digital content or part thereof is redacted or censored before transmission thereof to the user device.

U.S. Pat. No. 8,949,878 for System for parental control in video programs based on multimedia content information by inventors Dimitrova, et al., filed Mar. 30, 2001, and issued Feb. 3, 2015, is directed to a parental control system provides the ability to automatically filter a multimedia program content in real time based on stock and user specified criteria. The criteria are used to teach a learning module in the system what types of video program segments are to be considered sensitive or objectionable so that the module's understanding of what is sensitive and what is not can be applied to other video programs to provide real-time filtering. The multimedia program is broken down into audio, video, and transcript components so that sound effects, visual components and objects, and language can all be analyzed collectively to make a determination of whether offending material is being passed along in the multimedia program. The user has the option of training the system for any type of objectionable material, not just sex and violence.

US Patent Publication No. 2023/0177805 for Real time local filtering of on-screen images by inventors Korenwaitz, et al., filed Oct. 30, 2022, and published Jun. 8, 2023, is directed to a system and method for detecting inappropriate content on a device and filtering content on a variety of media. Inappropriate content is detected by taking a sample of media from at least one of a local memory, a data stream from a network and a data stream from local sensor, pre-processing the sample using a local processor and locally stored software to determine if the sample is a likely candidate to include objectionable content, in response to said sample being found to be a likely candidate perform at least one of quarantining the sample, marking the media, sending the sample to a remote processor for further analysis, analyzing the sample using an artificial intelligence routine running on a local processor and analyzing the sample using an artificial intelligence routine running on said local processor.

U.S. Pat. No. 10,349,126 for Method and apparatus for filtering video by inventors Yun, et al., filed Nov. 15, 2017, and issued Jul. 9, 2019, is directed to an artificial intelligence (AI) system for simulating functions such as recognition, determination, and so forth of a human brain by using a mechanical learning algorithm such as deep learning, or the like, and an application thereof. A method of filtering video by a device is provided. The method includes selecting at least one previous frame preceding a current frame being played from among a plurality of frames included in the video, generating metadata regarding the selected at least one previous frame, predicting harmfulness of at least one next frame to be displayed on the device after playback of the current frame, based on the generated metadata, and filtering the next frame based on the predicted harmfulness.

US Patent Publication No. 2024/0414394 for System and method to review online violence and education by inventors Christensen, et al., filed Jun. 7, 2024, and published Dec. 12, 2024, is directed to a computing system configured to obtain a video that includes text elements and visual elements. The computing system is further configured to generate a plurality of text tokens representative of audio spoken in the video and a plurality of frame tokens representative of one or more frames of the video. The computing system is further configured to generate a set of features that includes a text feature, a frame feature, and a multi-modal feature, wherein the multi-modal feature is representative of multi-modal elements of the video, and wherein generating the set of features is based on the plurality of text tokens and the plurality of frame tokens. The computing system is further configured to associate the set of features with one or more labels to generate a multi-label classification of the video. The computing system is further configured to output an indication of the multi-label classification of the video.

U.S. Pat. No. 11,778,271 for Classifying parental rating for better viewing experience by inventors Dhiman, et al., filed Mar. 29, 2021, and issued Oct. 3, 2023, is directed to limiting viewing of media content. More particularly, the present invention relates to classifying segments of content for limited viewing based on user preferences and classifications. According to a first aspect, there is provided a method for parental control of media content for a media guidance application, the method comprising, determining user preferences comprising settings for restricting viewing of segments of media content, determining media content for user consumption on a user device, determining a classification of each of a plurality of segments of the media content using a content analyzer and classifier, and comparing the determined classifications against the user preferences. In response to the comparing, the method further comprises the steps of, determining an action associated with the determined classification for restricting viewing of one or more of the plurality of segments of the media asset and modifying the one or more of the plurality of segments based on the determined action.

U.S. Pat. No. 12,063,415 for Selective streaming based on dynamic parental rating of content by inventors Dhiman, et al., filed Jan. 29, 2021, and issued Aug. 13, 2024, is directed to systems and methods to selectively stream content based on parental control ratings. A particular frame of a live broadcast of a media asset that is to be transmitted to a first device is identified, and it is determined whether the particular frame of the media asset depicts content associated with a parental control rating. In response to such determination, the particular frame and metadata associated with the particular frame that indicates that the particular frame depicts content associated with the parental control rating may be transmitted to the first device, where the transmittal of the metadata causes the first device to perform an action related to display of the particular frame based on comparing the parental control rating with a local parental control setting.

U.S. Pat. No. 11,568,280 for System, method, and computer program for parental controls and recommendations based on artificial intelligence by inventors Hermoni, et al., filed Jan. 23, 2019, and issued Jan. 31, 2023, is directed to a system, method, and computer program product for parental controls and recommendations based on artificial intelligence. In use, using an artificial intelligence (AI) server, explicit input is received associated with a first presentation of media. Additionally, the AI server is trained based on the explicit input, and using the AI server, implicit filters are created based on the training. Further, using the AI server, the implicit filters are applied to a second presentation of the media.

SUMMARY OF THE INVENTION

The present invention relates to content control technology for children and vulnerable individuals, and more specifically to an artificial intelligence (AI) system for automatically detecting and blocking harmful content, including self-generated and illegal content.

It is an object of this invention to provide an embedded artificial intelligence (AI) system for automatically detecting and blocking harmful content, including self-generated content.

In one embodiment, the present invention includes a system for automatic content detection and blocking on a user device, including at least one computer processor including a memory, a machine learning (ML) model, an enforcement module, and a user device, wherein the ML model includes a neural network including a convolutional layer and/or a transformer layer configured for on-device inference, wherein the ML model is embedded into an operating system on the user device by at least one optimization technique, wherein the at least one optimization technique includes at least one of model compression, hardware acceleration, and/or code optimization, wherein the ML model is trained based on a dataset, wherein the dataset includes images, text descriptions, videos, audio, and/or any other multimedia content, wherein the ML model is operable to automatically detect content displayed on a screen of the user device, wherein the ML model is operable to conduct a frame-by-frame pixel differentiation comparison, wherein the ML model is operable to automatically determine whether the content includes one or more restricted categories of material, and wherein the enforcement module is operable to automatically block portions of the content that include one or more restricted categories of material from being displayed on the screen of the user device without blocking all the content.

In another embodiment, the present invention includes a method for automatic content detection and blocking, including at least one computer processor including a memory, a machine learning (ML) model built on efficient vision transformer (EVT) architecture, an enforcement module, and a user device, utilizing, by the EVT architecture, structural reparameterization and reparameterizable convolutional token mixing, embedding the ML model into an operating system on the user device by at least one optimization technique, wherein the at least one optimization technique includes at least one of model compression, hardware acceleration, and/or code optimization, training the ML model based on a dataset, wherein the dataset includes images, text descriptions, videos, audio and/or any other multimedia content, automatically detecting content displayed on a screen of the user device, automatically conducting a frame-by-frame pixel differentiation comparison, automatically determining whether the content includes one or more restricted categories of material, and automatically blocking portions of content that include one or more restricted categories of material from being displayed on the screen of the user device without blocking all the content.

In yet another embodiment, the present invention includes a system for automatic content detection and blocking on a user device, including a computer processor including a memory, a machine learning (ML) model, an enforcement module, and a user device, wherein the ML model includes a neural network including a convolutional layer and/or a transformer layer configured for on-device inference, wherein the ML model is embedded into an operating system on the user device by at least one optimization technique, wherein the at least one optimization technique includes at least one of model compression, hardware acceleration, and/or code optimization, wherein the ML model is trained based on a dataset, wherein the dataset includes images, text descriptions, videos, audio and/or any other multimedia content, wherein the ML model is operable to automatically detect content captured by a live camera of the user device, wherein the ML model is operable to conduct a frame-by-frame pixel differentiation comparison between consecutive frames, wherein the ML model is operable to automatically determine whether the content includes one or more restricted categories of material, and wherein the enforcement module is operable to automatically block portions of content that include one or more restricted categories of material from being captured by the live camera of the user device without blocking all the content.

These and other aspects of the present invention will become apparent to those skilled in the art after a reading of the following description of the preferred embodiment when considered with the drawings, as they support the claimed invention.

DETAILED DESCRIPTION

Figure 1:
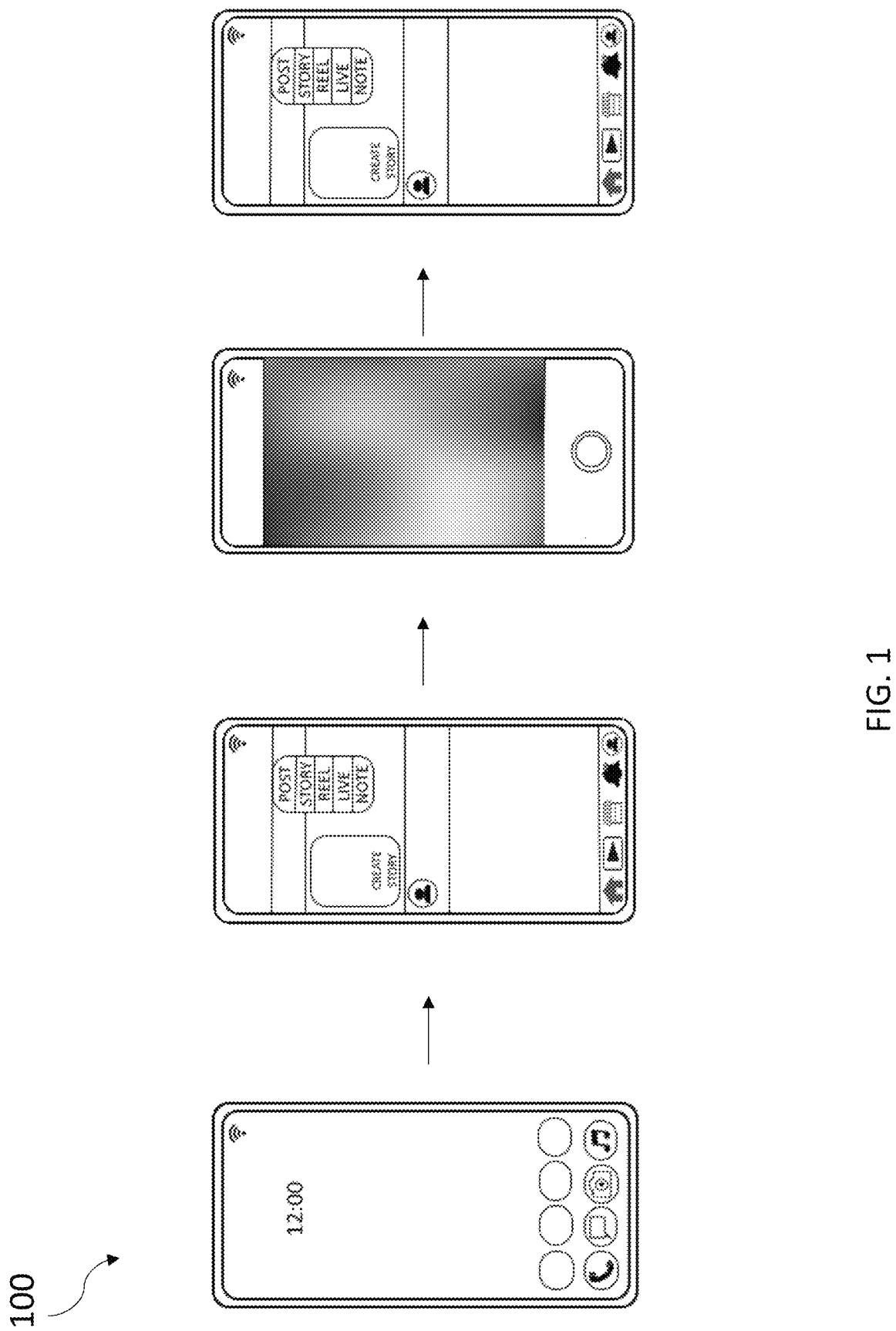
FIG. 1 illustrates a schematic diagram of the steps performed by a system for automatically blocking harmful content detected on an application of a user device, according to one embodiment of the present invention.

The present invention is generally directed to content control technology for children and vulnerable individuals, and more specifically to an artificial intelligence (AI) system for automatically detecting and blocking harmful content, including self-generated content.

In one embodiment, the present invention includes a system for automatic content detection and blocking on a user device, including at least one computer processor including a memory, a machine learning (ML) model, an enforcement module, and a user device, wherein the ML model includes a neural network including a convolutional layer and/or a transformer layer configured for on-device inference, wherein the ML model is embedded into an operating system on the user device by at least one optimization technique, wherein the at least one optimization technique includes at least one of model compression, hardware acceleration, and/or code optimization, wherein the ML model is trained based on a dataset, wherein the dataset includes images, text descriptions, videos, audio, and/or any other multimedia content, wherein the ML model is operable to automatically detect content displayed on a screen of the user device, wherein the ML model is operable to conduct a frame-by-frame pixel differentiation comparison, wherein the ML model is operable to automatically determine whether the content includes one or more restricted categories of material, wherein the enforcement module is operable to automatically block portions of the content that include one or more restricted categories of material from being displayed on the screen of the user device without blocking all the content, wherein the neural network includes an efficient vision transformer (EVT) architecture, and wherein the EVT architecture is operable to utilize structural reparameterization and reparameterizable convolutional token mixing, wherein the EVT architecture includes an image encoder with a text decoder, wherein the image encoder is trained on image-text pair datasets, wherein the image encoder is operable to compare image features to predefined prompt embeddings, wherein the restricted categories of material include child sexual abuse material (CSAM), not safe for work (NSFW) content, and/or inappropriate self-generated content, wherein the inappropriate self-generated content is inappropriate content generated by a user of the user device, wherein the dataset is enriched by generative adversarial network (GAN)-based augmentation, wherein the GAN-based augmentation generates synthetic images or videos which mimic real-world images or videos, including noise patterns, motion blur, low-light conditions, and/or occlusion, wherein the ML model includes region of interest (ROI) filtering, wherein the ROI filtering is operable to analyze and filter specific regions within the content, wherein the ML model includes low-rank adaptation (LoRA), wherein the LoRA is operable to adjust the ML model based on instruction sets, wherein the EVT architecture includes a contrastive language-image pre-training (CLIP) based safety reward function, wherein the ML model is operable analyze local storage of the user device, and wherein the enforcement module is operable to automatically quarantine, delete, or encrypt restricted content in the local storage of the user device, wherein the user device is a smartphone, a laptop, a tablet, a smartwatch, a smart television, a gaming console, an e-reader, a digital camera, an internet of things device, a wearable device, a smart home device, a virtual reality headset, an augmented reality headset, a security camera, and/or a baby monitoring device, wherein the neural network includes adversarially trained architecture or layers operable to provide provable adversarial robustness guarantees, and wherein the content displayed on the screen of the user device includes content simultaneously captured from a plurality of cameras on the user device.

In another embodiment, the present invention includes a method for automatic content detection and blocking, including at least one computer processor including a memory, a machine learning (ML) model built on efficient vision transformer (EVT) architecture, an enforcement module, and a user device, utilizing, by the EVT architecture, structural reparameterization and reparameterizable convolutional token mixing, embedding the ML model into an operating system on the user device by at least one optimization technique, wherein the at least one optimization technique includes at least one of model compression, hardware acceleration, and/or code optimization, training the ML model based on a dataset, wherein the dataset includes images, text descriptions, videos, audio and/or any other multimedia content, automatically detecting content displayed on a screen of the user device, automatically conducting a frame-by-frame pixel differentiation comparison, automatically determining whether the content includes one or more restricted categories of material, automatically blocking portions of content that include one or more restricted categories of material from being displayed on the screen of the user device without blocking all the content, further comprising implementing region of interest (ROI) filtering into the ML model, wherein the ML model is operable to analyze and filter specific regions within the content based on the ROI filtering, further comprising implementing low-rank adaptation (LoRA) to adjust the ML model based on instruction sets, further comprising an image encoder with a text decoder in the EVT architecture, wherein the image encoder is trained on image-text pair datasets, wherein the image encoder is operable to compare image features of the content to predefined prompt embeddings, further comprising enriching the dataset by generative adversarial network (GAN)-based augmentation, wherein the GAN-based augmentation generates synthetic images or videos that mimic real-world images or videos, including, noise patterns, motion blur, low-light conditions, and/or occlusion, and wherein the restricted categories of material include child sexual abuse material (CSAM), not safe for work (NSFW) content, and/or inappropriate self-generated content, wherein the inappropriate self-generated content is inappropriate content generated by a user of the user device.

In yet another embodiment, the present invention includes a system for automatic content detection and blocking on a user device, including a computer processor including a memory, a machine learning (ML) model, an enforcement module, and a user device, wherein the ML model includes a neural network including a convolutional layer and/or a transformer layer configured for on-device inference, wherein the ML model is embedded into an operating system on the user device by at least one optimization technique, wherein the at least one optimization technique includes at least one of model compression, hardware acceleration, and/or code optimization, wherein the ML model is trained based on a dataset, wherein the dataset includes images, text descriptions, videos, audio and/or any other multimedia content, wherein the ML model is operable to automatically detect content captured by a live camera of the user device, wherein the ML model is operable to conduct a frame-by-frame pixel differentiation comparison between consecutive frames, wherein the ML model is operable to automatically determine whether the content includes one or more restricted categories of material, wherein the enforcement module is operable to automatically block portions of content that include one or more restricted categories of material from being captured by the live camera of the user device without blocking all the content, wherein the content captured by the camera of the user device is livestreamed through an application on the user device, wherein the system is operable to intercept and process camera data and/or application data, and wherein the system is operable to modify the intercepted camera and/or application data before transmitting the camera data and/or application data to a second user device, wherein the neural network includes efficient vision transformer (EVT) architecture, and wherein the EVT architecture is operable to utilize structural reparameterization and reparameterizable convolutional token mixing, wherein the EVT architecture includes an image encoder with a text decoder, wherein the image encoder is trained on image-text pair datasets, wherein the image encoder is operable to compare image features to predefined prompt embeddings, wherein the restricted categories of material include child sexual abuse material (CSAM), not safe for work (NSFW) content, and/or inappropriate self-generated content, wherein the inappropriate self-generated content is inappropriate content generated by a user of the user device, further comprising an over-the-air update module operable to securely download and deploy updates, wherein the ML model includes a temporal smoothing mechanism, and wherein the enforcement module is operable to block multiple content streams simultaneously.

None of the prior art discloses an embedded artificial intelligence (AI) system for preventing exposure to, and the creation of, inappropriate content by automatically detecting and blocking harmful content, including self-generated, stored, unwanted, and/or banned content.

The increased use of and access to technology, specifically, but not exclusively, for minors, children, and other vulnerable individuals, has led to increased exposure to inappropriate and adult content. A child may be exposed to inappropriate content in a plurality of different ways, such as actively searching for explicit content online, accidentally searching or encountering explicit content, mistyping internet searches, unknowingly selecting inappropriate content, social media, chatrooms, messaging applications and/or any other interactive application where users can interact, selecting spam or phishing messages or pop-ups, exposure through unmonitored chatrooms/messaging applications, and/or a friend, sibling, or predator sharing the inappropriate content.

Inappropriate content may include sexually explicit material, including pornographic material such as images, videos, and/or language, child sexual abuse material (CSAM) such as images, videos, and/or language, not safe for work (NSFW) content, and content or websites that contain or promote hateful and/or offensive material, such as self-harm, bullying, crime, violence, terrorism, gore, extremism, suicide, hate speech, and/or any other material that an individual does not want to encounter.

Not only may a child be exposed to inappropriate content, but there is also a risk that a child may by coerced or duped into creating self-generated inappropriate content, such as videos, photos, and/or messages. The exposure to harmful content and/or messaging can lead a minor to self-generate inappropriate imagery, leading to exploitation, sexual coercion, and/or extortion of the minor.

Exposure to and creation of inappropriate content often leads to harmful behaviors, addiction, and negative lifelong outcomes for the exposed minor. Additionally, the exposure to violent, misleading, or graphic messages and/or visuals regarding sexual practices presents a risk of conveying inaccurate and inappropriate ideas about sexual relationships to the exposed child, thereby creating further struggles for the child.

The more active a child is online, the higher the likelihood that a child encounters some type of inappropriate content and/or generates inappropriate content themselves. Thus, it is imperative that children utilize websites, platforms, applications, and/or smart devices that are appropriate for their age and maturity level. However, without parental control or regulating or moderating technology, there is no mechanism to control what children search for and/or are exposed to on the internet. Thus, there must be safeguards to protect a child or any other vulnerable individual from exposure to such inappropriate content and/or creating inappropriate content.

Many conventional approaches to control content exposed to minors involve blocking or removing the inappropriate content based on set rules and criteria. Traditional parental control technology allows parents/guardians to monitor and limit what a child is able to access and see online by blocking access to specific websites, apps, or functions. Additionally, traditional parental control technology provides filtering different kinds of content on websites, such as sexual or adult content, limiting whom the child is able to communicate with, setting time limits for online/device activity, and/or monitoring a child's use of the device. However, traditional parental control technology does not provide for the ability to control self-generated, camera-captured content of the user, such that a user is restricted from inappropriately recording or photographing themselves based on coercion, naivety, innocence, and/or duping from the internet. Nor does traditional parental control technology provide for harm detection embedded within the operating system of a user device and/or within the application, as most traditional parental control technology requires a cloud and/or internet connection. There are also security and privacy risks associated with the traditional parental control technology, as the internet and/or cloud connection exposes the user to privacy risks. Therefore, there is a need for parental control technology that does not require an internet and/or cloud connection, thus providing enhanced privacy for a user.

Moreover, traditional parental control technology does not work in specific applications, such as social media applications, chatrooms, and/or messaging applications, thus, traditional technology is not capable of preventing the viewing of harmful content within these types of applications.

Traditional parental control technologies often require detailed configuring and onboarding, presenting a barrier to the installation process, plus if not configured and/or onboarded, or if configured and/or onboarded incorrectly, it may fail to work appropriately. Thus, there is a need for technology that is operable to detect and block harmful content from the moment the device is turned on and without the need for complex configuration.

Traditional artificial intelligence (AI) solutions for content control are so large that they require significant processor power and are too large to run on a small user device, such as a smartphone. Compression of these traditional AI solutions would typically compromise the accuracy of the AI technology, which in turn compromises the safety of a user, as the technology would not be accurate or thorough.

Thus, there is a long felt but unmet need for technology to run on the device and to prevent exposure of a child to inappropriate content, while simultaneously preventing a child from self-creating camera-captured inappropriate content. Specifically, there is a long felt but unmet need for technology capable of being embedded within a user device such that the technology is capable of being compressed to be lightweight, operate rapidly, and in particular with livestream and live camera environments, be accurate, not consume significant battery power, nor interfere with other applications running on the user device, wherein the technology is operable from the moment the user device is turned on, and further such that there is no internet or cloud connection necessary, thereby providing enhanced privacy for the user.

The present invention provides an artificial intelligence (AI) system for preventing exposure to, and the creation of, inappropriate content.

Referring now to the drawings in general, the illustrations are for the purpose of describing one or more preferred embodiments of the invention and are not intended to limit the invention thereto.

In one embodiment, the system of the present invention provides a lightweight multimodal visual-language model engineered to accurately detect and filter harmful or inappropriate content, including CSAM and/or NSFW material, on devices with limited computational resources.

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short-term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, the machine learning (ML) model of the system of the present invention is built on efficient vision transformer (EVT) architecture, wherein the EVT architecture utilizes structural reparameterization and reparameterizable convolutional token mixing to achieve high performance with low computational overhead. The EVT architecture receives an input and evaluates the input via an on-device safety scoring mechanism. The EVT architecture generates an initial score, then dynamically routes the input to an appropriate expert module, such as a neutral-content expert (NCE), not safe for work (NSFW) expert (NSE), or a contextual-scene unit (CSU) based on the input. The EVT dynamically routes the input to the appropriate module, conserving resources by applying minimal processing to benign content and high-capacity modules only when necessary. In one embodiment, the appropriate expert module is a subsystem of the ML model. In another embodiment, the appropriate expert module is a separate software from the ML model, wherein the ML model communicates with the appropriate expert module via an application programming interface (API). The EVT architecture advantageously provides for the system of the present invention to be embedded directly into the operating systems (OS) of devices, including, but not limited to, ANDROID, IOS, WINDOWS, MACOS, and/or LINUX operating systems. In one embodiment, the embedded system is operable to intercept and/or process camera data and/or a plurality of other media streams at the operating system level. In one embodiment, the EVT architecture for the system of the present invention can also be embedded and deployed on hardware, including, but not limited to, chipsets, neural processing units (NPUs), digital sign processors (DSPs), field-programmable gate arrays (FPGAs), and/or application-specific integrated circuits (ASICs).

The EVT architecture includes LiteMixer blocks, structural reparameterization, mixed precision and LoRA adapters, and multimodal alignment via detachable projectors.

In one embodiment, the LiteMixer blocks include a combination of depth-wise and point-wise convolutions, therefore reducing the number of floating-point operations (FLOPs) required. The LiteMixer blocks reduce computational cost to less than a standard vision transformer (ViT), making the EVT architecture efficient and operable to be deployed for on-device edge computing.

In one embodiment, the structural reparameterization is operable to, during model export, mathematically combine residual skip connections and batch normalization layers into a single convolutional layer to ensure deterministic latency.

In one embodiment, the mixed precision and LoRA adapters compute with int8 activations and fp16 weights, significantly reducing memory footprint and interference latency. In parallel, LoRA adapters are inserted into transformer layers, enabling domain-specific fine-tuning without modifying the base model weights.

In one embodiment, the multimodal alignment via detachable projectors includes a detachable 256-dimensional multimodal projection head that aligns CLIP-derived image embeddings with associated textual tokens or prompts. This enables semantic alignment across vision and language modalities, supporting tasks such as zero-shot classification and interpretability.

The EVT's architectural features enable the EVT to function for device-level content moderation and blocking, especially in resource-constrained (i.e., depleting phone battery) environments.

The expert modules include modules (i.e., software code integrated into the ML model or standalone software called by the ML model via an API) optimized for a specific task. For example, the NCE module is operable to provide classification for benign or clearly neutral content to minimize latency. The NSE module is operable to utilize adversarially trained classifiers for identifying sexually explicit or sensitive content. The CSU module adds contextual understanding to distinguish visually similar scenarios (e.g., beachwear v. lingerie), using broader scene-level features and labels. The prompt-alignment unit (PAU) supports zero-shot capabilities by comparing the image embedding to embedded prompts. The ROI filtering module identifies and masks sensitive regions within an image (e.g., specific body parts), allowing for more targeted enforcement instead of full-image blocking. The mobile-simulation module preprocesses input to correct for device-specific artifacts (i.e., glare, overlays, screenshot distortions), simulating how content appears in real-world mobile environments. The expert modules of the EVT architecture enable dynamic, context-aware classification decisions.

In one embodiment, the EVT architecture is embedded into an ANDROID operating system, wherein the ML model is operable to be embedded into the camera driver stack and/or the camera hardware abstraction layer (HAL), wherein the ML model is operable to intercept preview content frames and/or captured content, including images and/or videos, before the content reaches user-level applications. In one embodiment, a system-level service daemon is operable to communicate with the camera subsystem via binder inter-process communications (IPCs), wherein the ML model is run on each frame in real time. In one embodiment, the EVT architecture is securely deployed, wherein a locked classifier is operable to reside in a trusted region, including the read-only system partition and/or a trusted execution environment (TEE), thereby preventing tampering.

In one embodiment, the EVT architecture is embedded into an IOS operating system. In one embodiment, the ML model can hook into IOS's AVCapture session to analyze frames of content in real time before the content reaches user applications. In one embodiment, performance of the ML model can be boosted by optimizations through CORE ML and/or APPLE NEURAL ENGINE (ANE). In one embodiment, battery consumption of the user device can be reduced based on optimization through CORE ML and/or ANE. In one embodiment, IOS sandboxing and/or secure enclave features ensure the classifier is delivered in a tamper-resistant manner.

In one embodiment, the EVT architecture is embedded into a WINDOWS operating system. In one embodiment, the WINDOWS DRIVER FRAMEWORK (WDF) is used to allow a filter driver to be inserted into the imaging and/or camera driver stack to process content frames through the ML model. In one embodiment, the ML model can be wrapped as a MEDIA FOUNDATION TRANSFORM (MFT) or a DIRECTSHOW filter to intercept and/or classify content frames before the content frames reach user applications. In one embodiment, code signing and/or protected processes ensure that the classifier remains locked and cannot be easily modified.

In one embodiment, the EVT architecture is embedded into a MACOS operating system. In one embodiment, the ML model can integrate into AVFOUNDATION capture pipelines to process content including, live camera feeds and/or images in real time. In one embodiment, a system extension or driver-level hook can intercept content frames at a lower level, leveraging the machine learning hardware of the MACOS operating system for accelerated interference. In one embodiment, the integrity protections and/or sandboxing of the MACOS operating system contribute to a secure tamper-resistant deployment.

In one embodiment, the EVT architecture is embedded into a LINUX operating system. In one embodiment, the ML model can intercept content frames from a camera and/or sensor interface, including '/dev/video*', via a kernel-level or user-space proxy that taps into the Video4Linux2 pipeline. In one embodiment, a system daemon coordinates classification requests, including security frameworks including SELINUX and/or APPARMOR, restricting unauthorized access.

In one embodiment, the EVT architecture is operable to balance high performance with low computational overhead, such that the system of the present invention is operable to be embedded in devices. In one embodiment, the ML model is operable, based on the EVT architecture, to operate efficiently on devices with limited processing and memory power, while ensuring favorable inference times and limited energy consumption.

The EVT architecture enables rapid successive screen captures for frame-by-frame analysis. The frame-by-frame analysis is conducted by artificial intelligence utilizing the ML model. The EVT architecture further conducts a differential pixel comparison between consecutive frames to avoid redundant processing.

In one embodiment, the ML model is trained based on a dataset. In one embodiment, the dataset used to train the ML model includes images, text descriptions, videos, audio, and/or any other multimedia content. In one embodiment, the dataset used to train the ML model includes full image training, wherein the full image training includes using complete and standalone images as training data, wherein the ML model analyzes the entire image as a single entity. In one embodiment, the dataset used to train the ML model includes training on mobile device recorded content, including captured full-screen activity on a mobile device, dynamic content, user interactions, and/or contextual environments, wherein the ML model is trained on frames extracted from recorded videos of the mobile device activity, including browsing sessions, social media interactions, camera activity, and/or in-application content. In one embodiment, the ML model is operable to run on each frame extracted from recorded videos and/or a series of frames extracted in real time, enabling temporal analysis of sequential frame data to detect motion patterns, transitions, and/or changes over time, providing increased stability of the outputs of the ML model in complex and/or dynamic environments. In one embodiment, the images include neutral images, legally inappropriate images, including NSFW images, and/or illegal images, including CSAM images. In one embodiment, the images include corresponding text descriptions. In one embodiment, the dataset includes pairs of images and corresponding textual instructions or descriptions. In one embodiment, the neutral images with corresponding text descriptions allow the ML model to improve its ability to distinguish between NSFW and non-NSFW content, in a plurality of different contexts.

In one embodiment, an image encoder with a text decoder is incorporated into the EVT architecture. In one embodiment, the image encoder is a contrast language-image pre-training (CLIP) neural network. In one embodiment, the image encoder is trained on image-text pair datasets, providing for the ML model to interpret structured prompts and enhance the flexibility of the ML model. In one embodiment, the image encoder is operable to compare image features to predefined prompt embeddings.

In one embodiment, the image encoder is trained with labels describing activities, objects, scenes, and/or other contexts within the images, videos, or other multimedia content, providing for deep semantic understanding. In one embodiment, pre-trained language models are used to generate accurate and/or descriptive labels for the images, videos, and/or other multimedia content. Training the ML model with detailed activity descriptions allows the ML model to analyze complex scenes and/or activities, reducing misclassifications.

In one embodiment, supervised fine-tuning (SFT) is applied to the ML model to improve the ML model's performance on specific tasks. Through the use of SFT, the ML model learns from specific examples, which improves the ML model's ability to generalize.

In one embodiment, the dataset is enriched by generative adversarial network (GAN)-based augmentation, wherein new data points are added to the existing dataset, thereby enriching the dataset and providing a broader dataset for the ML model to be trained on. In one embodiment, the GAN-based augmentation generates synthetic images or videos that mimic real-world artifacts, including, but not limited to, noise patterns, motion blur, low-light conditions, and/or occlusion.

In one embodiment, a plurality of large and diverse datasets are utilized to enhance the training and understanding of the ML model, providing for improved generalization and robustness. In one embodiment, the ML model is capable of blocking self-generated content by understanding noise patterns generated by the camera, including but not limited to, low light conditions, blurred images, and/or a low-resolution camera-produced images.

In one embodiment, the dataset is expanded to include different resolutions, contrasts, saturations, camera qualities, and/or diverse ethno-demographics covering different age groups. In one embodiment, the dataset includes training on dark mode and/or light mode, wherein the dark and/or light mode corresponds to the screen settings on the user device.

In one embodiment, the dataset is further augmented through a plurality of data augmentation techniques. In one embodiment, the dataset is augmented by noise and distortion augmentation techniques, wherein Gaussian noise and other noise distortions are introduced, including moiré patterns, to simulate real-world imperfections. In one embodiment, the dataset is augmented by geometric transformations, wherein random cropping, flipping, rotating, and/or scaling is used to ensure the ML model becomes invariant to changes in orientation and size. In one embodiment, the dataset is augmented by color and brightness adjustments, wherein the brightness, contrast, hue, and/or saturation is adjusted, and random gamma corrections are applied to prepare the ML model for varied lighting conditions, including the use of filters, effects, front camera displays, and/or back camera displays. In one embodiment, coarse dropout is incorporated and/or random text overlays and/or artifacts are added to mimic occlusions and interference present in real-world imagery. In one embodiment, the dataset is augmented by letterboxing and padding, wherein letterboxing is applied with different pad colors to ensure the ML model can handle aspect ratio variations without distorting image content. In one embodiment, the dataset is augmented by orientation modes, wherein both portrait and landscape orientations are simulated, and mobile screen simulations are incorporated that mimic effects including screen glare and/or reflections. In one embodiment, the dataset is further augmented by generating different algorithmically generated grid layouts, ensuring the dataset includes images with a variety of grid configurations, simulating sensor artifacts, and/or user interface overlay scenarios accurately. In one embodiment, the dataset is augmented through mobile screen simulation, wherein mimicking is used to show how images appear on mobile devices by introducing effects, including screen glare and/or reflections, which helps to capture user interface overlays, device frame effects, and other visual nuances seen in mobile applications. Additionally, a mobile application screen is incorporated where images are programmatically placed to simulate the actual display conditions. In one embodiment, the dataset is further augmented by variations in camera quality, wherein images are captured with different camera specifications, including variations from low-end sensors to high-resolution cameras, in order to simulate the diverse image qualities found in real-world devices. In one embodiment, the dataset is augmented through demographic and mode diversity, wherein images are included which represent diverse ethno-demographic and age groups. Additionally, variations that correspond to dark and light modes on devices are included. In one embodiment, the dataset is further augmented through a plurality of generative models and/or algorithmic methods, including latent diffusion models. In one embodiment, latent diffusion models include generating diverse noise patterns, including moiré effects and/or stylistic variations. For example, a standard image can be transformed into an anime-style illustration or artistic re-stylings can be applied to enrich the dataset with new visual themes. In one embodiment, the data augmentation techniques are modular and are operable to be combined or adjusted. In one embodiment, the data augmentation techniques enhance the adaptability of the ML model to real-world conditions, including real-world conditions affecting a camera of a user device.

In one embodiment, the dataset is further augmented through adversarial and perturbation-based techniques. In one embodiment, adversarial sampling includes modifying images in an adversarial way to intentionally create a challenging example in the training set, thereby improving the ML model's robustness against subtle yet impactful distortions. In one embodiment, perturbation techniques include applying calculated perturbations to images, thereby helping the ML model to learn how to manage slight noise and other artifacts that may occur in real-world scenarios.

In one embodiment, the ML model is trained using cloud-based training. In one embodiment, cloud-based data processing is used. By way of example and not limitation, the cloud-based platform used for training and data processing include AMAZON WEB SERVICES, GOOGLE CLOUD PLATFORM, and/or MICROSOFT AZURE.

In one embodiment, a CLIP-based safety reward function is incorporated into the EVT architecture to guide the ML model's decision-making process to align with human judgments on safety and acceptable material, thereby enhancing the ML model's ability to detect harmful content effectively. In one embodiment, the CLIP-based safety reward function aligns the ML model's outputs with human judgments of safe versus harmful content. In one embodiment, the CLIP-based safety reward function is built on the contrastive language-image pre-training (CLIP) model, which is pre-trained to generate a shared embedding space for both images and text, allowing the system to compare an image's features with textual descriptions that define safe or harmful content. In one embodiment, during training, the ML model extracts features from an input image and compares those features to a set of predefined prompt embeddings that represent categories, including "safe" and "harmful" categories. In one embodiment, a similarity metric quantifies how closely the image features match the textual descriptions, providing a similarity score. In one embodiment, the similarity score serves as a reward signal, wherein higher scores indicate better alignment with human safety expectations.

In one embodiment, the overall training process of the ML model incorporates three main components, including a standard classification loss, an adversarial robustness term, and the CLIP-based safety reward. Within this training framework, the CLIP-based safety reward is applied such that when the image features align more closely with the safe content prompts, the resulting reward effectively reduces the training loss, thereby encouraging the model to prioritize the correct identification of harmful content. In one embodiment, weighting factors are used to balance the contributions of adversarial robustness and the CLIP-based safety reward. In one embodiment, adversarial robustness includes architectural or training techniques that provide a formal guarantee that the ML model will not change an output when an input is perturbed within a bounded norm.

In one embodiment, the CLIP-based safety reward function acts as a contrastive supervisory signal, wherein it encourages the ML model to bring together image embeddings that match safe content descriptions, while pushing apart embeddings that correspond to harmful, CSAM, or NSFW content. In one embodiment, the contrastive supervisory signal helps the ML model develop more discriminative features, thereby enabling the ML model to capture the subtle cues indicative of harmful content. Further, the CLIP-based safety reward function encourages recognition of human gestures. For example, in one embodiment, the ML model is operable to identify a human gesture, such as an individual holding their arms up to form a cross, or places their hands over their face, indicating that the individual does not wish to be filmed or an image captured, and the ML model will identify the human gesture as equivalent to harmful content using the CLIP-based safety reward function.

In one embodiment, the ML model is sensitive to adversarial examples based on the integration of the CLIP-based safety reward into the training process. In one embodiment, images subject to perturbations, including noise or other distortions, result in the CLIP-based safety reward function guiding the ML model to maintain alignment with human safety standards, ensuring robust performance in real-world conditions.

In one embodiment, multimodal learning is integrated into the ML model, providing for more advanced simultaneous processing of both visual and textual data. In one embodiment, a small language model is integrated into the EVT architecture. In one embodiment, a multimodal projector is integrated into the EVT architecture. In one embodiment, the small language model and the multimodal projector enable the ML model to process and understand semantic relationships with textual data, including training the ML model on image-text pairs to build associations between images and their descriptions.

In one embodiment, the EVT architecture includes a modular design, wherein the ML model is structured with multiple specialized units, wherein each specialized unit is trained to handle specific types of content and/or features. In one embodiment, the EVT architecture includes a dynamic selection mechanism, wherein inputs are evaluated to determine which specialized unit is most suitable for processing the input, wherein the ML model leverages expertise where it is most effective. In one embodiment, the EVT architecture permits the ML model to more accurately detect a variety of content types, while simultaneously maintaining efficient processing. In one embodiment, the EVT architecture permits the addition of new specialized units to address emerging content categories without overhauling the entire EVT architecture. In one embodiment, the EVT architecture is operable to only activate the necessary components for a given input, thereby optimizing computational resources and reducing unnecessary load.

In one embodiment, dynamic augmentation and preprocessing enable real-time data manipulation and increase the ML model's resilience to varied input conditions.

In one embodiment, a plurality of tools, platforms, libraries, packages, and/or modules are employed throughout the development of the ML model, including, but not limited to, tools for data processing, tools for model development and management, tools for model exporting and deployment, tools for training infrastructure, tools for embedded development, tools for monitoring and analytics, and/or tools for version control.

In one embodiment, the data processing tools include one or more PYTHON libraries or packages, such as PANDAS and/or NUMPY. In one embodiment, libraries or packages for model development and management include, but are not limited to, PYTORCH and/or MLFLOW. In one embodiment, the libraries or other tools for model exporting and deployment include, but are not limited to, ONNX, a mobile neural network (MNN), multi-task cascaded convolutional neural network (MTCNN), and/or CORE ML. In one embodiment, the tools for training infrastructure include, but are not limited to, AMAZON WEB SERVICES, GOOGLE CLOUD PLATFORM, and/or MICROSOFT AZURE. In one embodiment, the tools for embedded development include, but are not limited to, ANDROID STUDIO with JAVA/KOTLIN, C++ operating system (OS) level, and/or XCODE with SWIFT/OBJECTIVE-C. In one embodiment, the tools for monitoring and analytics include, but are not limited to, GOOGLE ANALYTICS FOR FIREBASE and/or CRASHLYTICS. In one embodiment, the platforms for version control include, but are not limited to, GITHUB and/or GITLAB.

In one embodiment, a plurality of tools are integrated into the ML model to monitor performance and capture errors. In one embodiment, the plurality of tools include, but are not limited to, GOOGLE ANALYTICS FOR FIREBASE and/or CRASHLYTICS.

In one embodiment, continuous integration/continuous delivery tools are utilized for building and deploying the ML model.

In one embodiment, the ML model is operable to be adjusted and improved, wherein new concepts, including, but not limited to specific objects or categories, are introduced to the ML model. For example, if the ML model struggles to distinguish swimwear from lingerie, the dataset is modified to include relevant examples to adjust and adapt the ML model for increased accuracy. In one embodiment, the ML model is operable to be trained on and operable to analyze new categories of harmful and/or sensitive content, including but not limited to, AI-generated material and material including violence, suicide, gore, self-harm, harm to others, drugs, alcohol, bullying, crime, terrorism, extremism, and/or hate speech. In one embodiment, the ML model is operable to integrate new classes of harmful and/or sensitive content without requiring a full architectural overhaul.

In one embodiment, prompt engineering is utilized to further adjust and improve the ML model, such that the ML model is operable to effectively follow instructions and accurately interpret and respond to complex prompts. In one embodiment, a distance-based prompt mechanism is implemented into the ML model to measure the semantic distance between content features and predefined prompts representing harmful categories, allowing for flexible and adaptable identification of inappropriate content based on client safeguarding goals and/or cultural and social nuance.

In one embodiment, feedback loops are utilized to further refine the ML model, wherein real-world scenarios are monitored to determine areas of improvement for the ML model, wherein data is collected for problematic cases, wherein the new data is labeled through a semi-supervised approach and/or a non-supervised approach, and wherein the new data is incorporated into the training dataset and the ML model is adjusted/fine-tuned to adapt to the new data concept.

In one embodiment, low-rank adaptation (LoRA) is implemented to efficiently fine-tune the ML model based on instruction sets, wherein the LoRA reduces the number of trainable parameters by injecting low-rank matrices, thereby making the fine-tuning computationally efficient and suitable for embedded devices. The integration of SFT and LoRA ensures the ML model is progressively refined without incurring significant computational overhead.

In one embodiment, region of interest (ROI) filtering is operable to be implemented into the ML model, wherein the ROI filtering is operable to analyze and filter out specific regions within a visual input. In one embodiment the visual input includes an image, a set of images, a video, and/or a full screen capture of a user device. In one embodiment, the ROI filtering enables the ML model to analyze a visual input and replace a relevant harmful region of interest with safe content. For example, if a child's face is shown in a photo, the ML model is operable to automatically replace the image of the child's face with, for example, an emoji or avatar, to safeguard the identity and privacy of the child. Advantageously, the ROI filtering enables the ML model to detect filtering-relevant areas in an image and/or video. Additionally, the ROI filtering enables the ML model to automatically adjust for different types of harm, thus enhancing the ML model's flexibility. In one embodiment, the ROI filtering enables the ML model to focus on relevant areas by excluding noise or non-critical elements, thereby improving accuracy and/or processing efficiency of the ML model. In one embodiment, the ROI filtering enables the ML model to pinpoint the precise location of harmful content within a visual input, which enables selective filtering by the ML model, wherein the ML model is operable to mask only the harmful regions of the content while simultaneously preserving the safe content. In one embodiment, the ROI filtering enables the ML model to automatically adjust based on relevant regions of interest.

In one embodiment, the ML model is operable to be embedded within a user device. In one embodiment, a plurality of optimization techniques are performed to render the ML model operable to be embedded on resource-constrained devices without negatively impacting the accuracy and/or inference speeds of the ML model, nor without negatively impacting the user's experience on the device and the applications running on the device. In one embodiment, the plurality of optimization techniques, include, but are not limited to, model compression, hardware acceleration, and/or code optimization. In one embodiment, model compression includes applying quantization and pruning to reduce the size of the ML model without compromising accuracy. In one embodiment, hardware acceleration includes leveraging device-specific accelerators, including GPUs and/or NPUs, through application program interfaces (APIs). In one embodiment, code optimization includes profile and optimized application code, which reduces memory footprint and improves inference speed.

In one embodiment, the user device is a smartphone, laptop, tablet, smartwatch, smart television, gaming console, e-reader, digital camera, IoT device, wearable device, smart home device, virtual reality (VR)/augmented reality (AR) headset, any device that uses a camera including, but not limited to, a security camera and/or a baby monitoring device, and/or any other type of user device.

In one embodiment, the ML model is transitioned from the cloud-based platform to a user device, wherein the ML model of the system of the present invention is integrated and embedded in the operating system of the device. In one embodiment, the trained ML model is exported to the open neural network exchange (ONNX) format. In one embodiment, the trained ML model is converted to a format compatible with mobile device runtimes. In one embodiment, the ML model is embedded into an application using a software development kit (SDK), wherein the SDK is developed in, but not limited to, C++ OS level, JAVA/KOTLIN for ANDROID systems, and/or SWIFT/OBJECTIVE-C for iOS systems.

In one embodiment, the ML model is operable to achieve a validation accuracy of approximately 95% or greater, wherein the validation accuracy reflects the effective CSAM, NSFW, and/or commercial sexual exploitation (CSE) content detection in controlled environments. In one embodiment, the ML model is operable to achieve a validation accuracy of approximately 90% or greater, wherein the validation accuracy reflects the effective CSAM, NSFW, and/or CSE content detection in controlled environments. In one embodiment, the ML model is operable to achieve a validation accuracy of approximately 85% or greater, wherein the validation accuracy reflects the effective CSAM, NSFW, and/or CSE content detection in controlled environments. In one embodiment, the ML model is operable to achieve a validation accuracy of approximately 80% or greater, wherein the validation accuracy reflects the effective CSAM, NSFW, and/or CSE content detection in controlled environments. In one embodiment, the ML model is operable to achieve a validation accuracy of 96.55%, wherein the validation accuracy reflects the effective CSAM, NSFW, and/or CSE content detection in controlled environments. In one embodiment, the ML model is operable to achieve a validation accuracy of 95.86%, wherein the validation accuracy reflects the effective CSAM, NSFW, and/or CSE content detection in controlled environments.

In one embodiment, the ML model is operable to achieve validation accuracy of at least 80% across all harm categories. In one embodiment, the ML model is operable to achieve a validation accuracy of at least 85% across all harm categories. In one embodiment, the ML model is operable to achieve validation accuracy of at least 90% across all harm categories. In one embodiment, the ML model is operable to achieve validation accuracy of at least 95% across all harm categories.

In one embodiment, the ML model is operable to achieve a 95% precision and recall accuracy. In one embodiment, the ML model is operable to achieve at or above 90% precision and recall accuracy. In one embodiment, the ML model is operable to achieve at or above 80% precision and recall accuracy. In one embodiment, the ML model is operable to achieve at or above 70% precision and recall accuracy. In one embodiment, the ML model is operable to achieve at or above 60% precision and recall accuracy.

In one embodiment, the ML model includes mechanisms to collect performance data and/or user feedback. In one embodiment, the ML model generates a descriptive vector. In one embodiment, the descriptive vector serves as a detailed semantic descriptor of the visual content, including image content. In one embodiment, the descriptive vector is computed by comparing the extracted image features against a predefined set of prompts, wherein the predefined set of prompts cover multiple semantic aspects. In one embodiment, the descriptive vector encodes content safety, activity descriptions, and/or demographic attributes. In one embodiment, the content safety includes differentiation between safe and non-safe content within an image. In one embodiment, the activity descriptions include identification and description of various activities and/or content within an image. In one embodiment, the demographic attributes include recognition and classification of attributes related to gender and/or race within an image. In one embodiment, the descriptive vector provides an immediate, human-readable explanation of the visual content. In one embodiment, the descriptive vector compares the generated visual telemetry with expected responses derived from the prompt set, wherein the system is operable to pinpoint discrepancies between the ML model's predictions and human judgment, wherein the pinpointed discrepancies are used as precise, actionable feedback to guide targeted re-training in the foundational ML model. In one embodiment, the descriptive vector is continuously monitored and integrated into a feedback loop, ensuring that any deviations in content classification are systematically identified and addressed, advantageously providing for continuous, data-driven improvements in the ML model's overall performance. In one embodiment, the deviations in content classification can relate to safety, activity recognition, and/or demographic identification.

In one embodiment, the system of the present invention includes the ML model, wherein the ML model is operable to collect performance data and user feedback. In one embodiment, the system provides a mechanism for a user to challenge an automated decision that content is deemed harmful. In one embodiment, the system of the present invention is operable to include a gallery review section. In one embodiment, the system of the present invention is operable to include a content flagged for review section.

In one embodiment, a plurality of methods are utilized to evaluate and improve the ML model. In one embodiment, categorical accuracy is measured to determine the proportion of correct predictions in classification tasks. In one embodiment, the ratio of true positives to the sum of true positives and false positives indicates the model's ability to avoid false positives. In one embodiment, recall is measured by determining the ratio of true positives to the sum of true positives and false negatives, indicating the ML model's ability to detect all relevant instances. In one embodiment, a false positive rate is determined by calculating the ratio of false positives to the sum of false positives and true negatives. In one embodiment, a true positive rate is determined. In one embodiment, to reduce false positives and account for varying image quality, the system is operable to include at least one temporal smoothing mechanism. In one embodiment, the temporal smoothing mechanism includes a moving average, sliding-window voting, a temporal-attention neural layer, and/or any other temporal smoothing mechanism.

In one embodiment, a lightweight image detector classifier is operable to analyze mobile device screens and detect the presence of visual content, including, but not limited to, images, videos, audio, animations, persons, animals, and/or any other multimedia content. In one embodiment, the lightweight image detector is operable to scan the screen and/or the camera application and return bounding boxes for all image locations. In one embodiment, the lightweight image detector classifier supports selective content blocking approaches, including only blocking certain aspects of the screen that specifically contain the harmful content. In one embodiment, the lightweight image detector classifier is operable to operate with a low memory footprint. In one embodiment, the lightweight image detector classifier is operable to operate with a response time of less than 50 ms. In one embodiment, the lightweight image detector classifier is operable to operate with a response time of approximately 50 ms. In one embodiment, the lightweight image detector classifier is operable to operate with a response time of approximately 40 ms to 50 ms. In one embodiment, the lightweight image detector classifier is operable to operate with a response time of approximately 40 ms. In one embodiment, the lightweight image detector classifier is operable to operate with a response time of less than 60 ms. In one embodiment, the lightweight image detector classifier is operable to operate with a response time of less than 70 ms.

In one embodiment, the lightweight image detector classifier is operable to operate as a pre-filtering mechanism, wherein the lightweight image detector classifier streamlines the content moderation process by only processing relevant screens.

In one embodiment, the lightweight image detector classifier is operable to include capabilities in detecting CSAM material. In one embodiment, the capabilities of the lightweight image detector classifier are expanded to cover additional harmful content, including, but not limited to, violence, self-harm, and/or other forms of harmful content. In one embodiment, the capabilities of the ML model are expanded to cover additional harmful content, including, but not limited to, violence, self-harm, and/or other forms of harmful content.

In one embodiment, the ML model is operable to operate in an air-gapped environment, ensuring secure and compliant training of the ML model on sensitive data related to various harm categories. In one embodiment, the air-gapped environment ensures data privacy and compliance with regulatory standards, thereby safeguarding sensitive information.

In one embodiment, the air-gapped environment supports training on dataset sizes of up to 5,000, 10,000, 60,000, and/or the entire dataset, permitting targeted refinement of the ML model. In one embodiment, the ML model is operable to resume training from the latest model, without needing to revert to the first version of the ML model.

In one embodiment, the system of the present invention includes the ML model and an enforcement module, wherein the ML model is operable to automatically detect harmful content displayed on the screen or in storage of a user device. In one embodiment, the system of the present invention includes the ML model, wherein the ML model is operable to automatically produce a classification, and wherein the enforcement module automatically blocks content based on the classification produced by the ML model, which blocks harmful content displayed on the screen of a user device. In one embodiment, the system of the present invention includes the ML model, wherein the ML model is operable to automatically detect harmful content displayed on the screen of a user device for the enforcement module to block the harmful content. Modern devices are operable to render multiple camera feeds, picture-in-picture windows, and/or virtual reality panels concurrently. Importantly, the enforcement module enumerates and protects all render targets instantiated dynamically during runtime and applies blocking logic independently and concurrently across all render targets. The enforcement module does not depend on static enumeration. In one embodiment, the enforcement module is a subsystem of software of the ML model operable to execute tasks. In another embodiment, the enforcement module is a separate software from the ML model, wherein the ML model communicates with the enforcement module via an application programming interface (API).

FIG. 1 illustrates a schematic diagram of the steps performed by a system of the present invention for automatically detecting and blocking harmful content detected on an application of a user device, generally described as 100, according to one embodiment of the present invention. In one embodiment, a user accesses an application on the user device, wherein the application displays harmful content, such that the ML model is operable to produce a classification, wherein an enforcement module is operable to automatically block the harmful content based on the classification by the ML model from being displayed on the user device. In one embodiment, the enforcement module blocks the harmful content by blurring the entire screen of the user device, placing visual graphics over the entire screen, blurring a portion of the screen of the user device that contains the harmful content, placing visual graphics over the specific region of harmful content, blocking the microphone, silencing the audio playing from the user device, stopping any video or multimedia from playing on the screen of the user device, displaying a warning message of harmful content, automatically shifting the camera away from the harmful content, displaying an option to learn more about why the content is harmful, shutting down the application on the user device, and/or shutting down the user device entirely. In one embodiment, the enforcement module is operable to mask the inappropriate content, wherein the enforcement module is operable to hide the inappropriate content until remedial action is taken by the user and/or the inappropriate content is no longer displayed. In one embodiment, the enforcement module is operable to substitute safe content in place of the inappropriate content. In one embodiment, the enforcement module is operable to display a message on the user device, wherein the message includes a warning of harmful and/or inappropriate content. In one embodiment, the enforcement module is operable to send a message to a third party when harmful and/or inappropriate content is displayed, wherein the message includes an alert of the harmful and/or inappropriate content. In one embodiment, the message is sent to a third party, including a parent, guardian, teacher, police, and/or any other individual or entity. In one embodiment, the enforcement module is operable to activate an alarm and/or siren on the user device when harmful and/or inappropriate content is displayed. In one embodiment, the system is operable to revert to the application functionality and display the application content once the inappropriate content has concluded, is exited, and/or is navigated away from. In one embodiment, the enforcement module is operable to provide mechanisms for a user to take a remedial action, including lifting a block and/or blur, to allow the deletion and/or navigation away from the harmful content.

In one embodiment, the system of the present invention is operable to detect and block harmful content on a user device that is in light screen mode. In one embodiment, the system of the present invention is operable to detect and block harmful content on a user device that is in dark screen mode.

In one embodiment, the system of the present invention is operable to access a camera application and/or an application utilizing the camera of the user device. In one embodiment, the system is operable to access a front-facing camera, a forward-facing camera, and/or any other camera of the user device. In one embodiment, the system is operable to access a camera application in real-time, wherein the system is operable to detect, based on the training datasets, harmful content being captured by the camera of the user device. In one embodiment, the harmful content is self-generated inappropriate content, namely, nudity and explicit sexual activity, including illegal versions, such as CSAM. In one embodiment, the system is then operable to automatically block the harmful content from the screen and/or audio of the user device, such that the user of the device cannot see or hear the harmful content.

Figure 2:
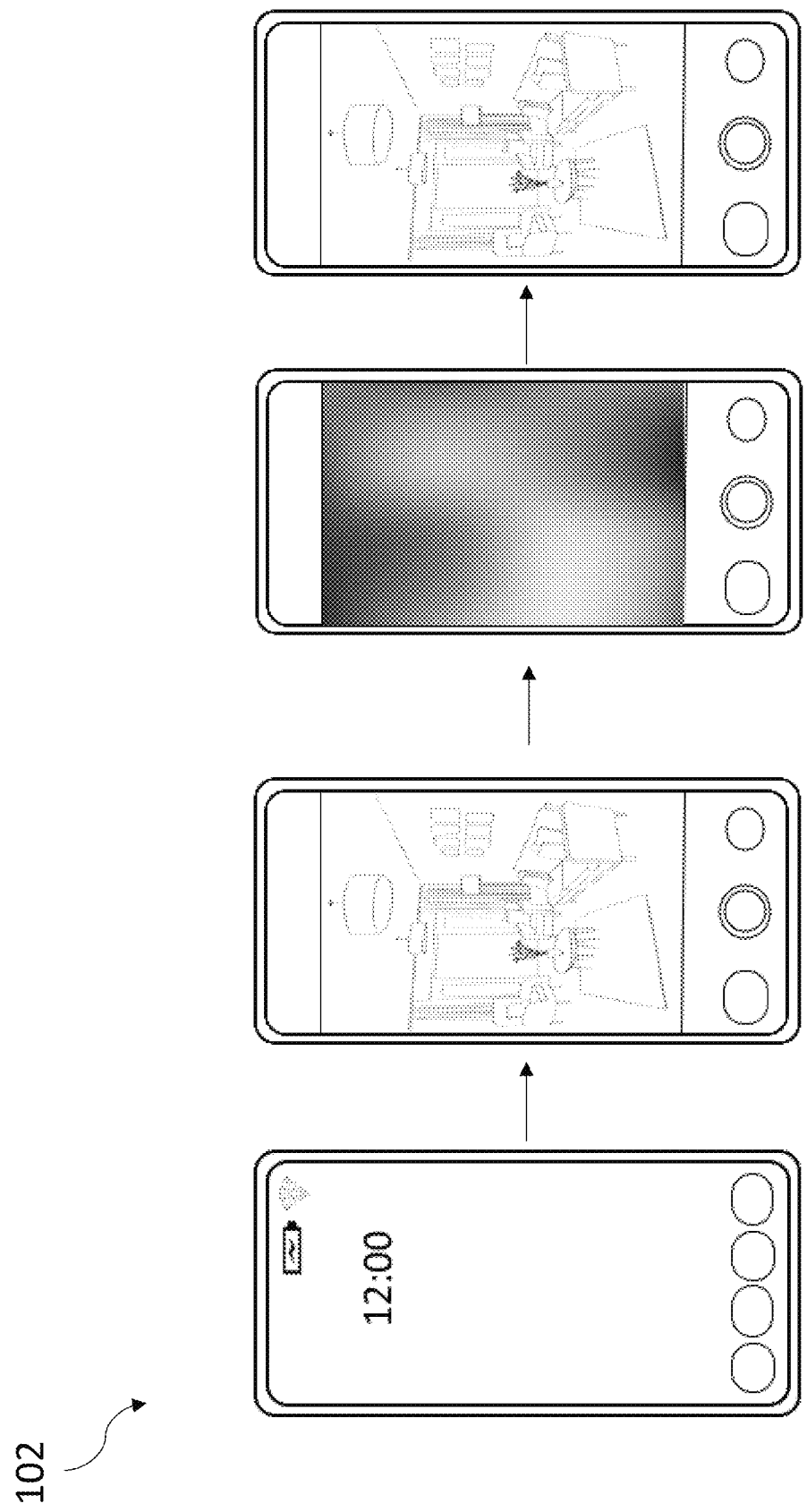
FIG. 2 illustrates a schematic diagram of the steps performed by a system for automatically blocking harmful content detected by a live camera of a user device, according to one embodiment of the present invention.

In one embodiment, the system of the present invention includes the ML model and an enforcement module, wherein the ML model is operable to produce a classification, and wherein the enforcement module is operable to act on the classification; for example, in one embodiment, the enforcement module is operable to automatically block harmful content detected by a live camera of a user device and/or stored content on the user device. FIG. 2 illustrates a schematic diagram of the steps performed by a system of the present invention for automatically blocking harmful content detected by a live camera of a user device, generally described as 102, according to one embodiment of the present invention. In one embodiment, a device includes the system integrated into the operating system of the device. In one embodiment, a user opens or accesses a camera application on the device, including, but not limited to the camera application itself, or any other application utilizing the camera of the device. Next, a user points the camera at harmless content, such as the environment the user is in, such as a living room. Then, a user points the camera at harmful content, including, but not limited to, nudity, violence, suicide, gore, self-harm, harm to others, drugs, alcohol, bullying, crime, terrorism, extremism, and/or hate speech, wherein the system automatically detects the harmful content and prevents the harmful content from being transmitted or shared from the device. In one embodiment, the air-gapped environment ensures data privacy and security of sensitive information, such as harmful self-generated content. By preventing the transmission or sharing of inappropriate self-generated content, the system protects minor users from exploitation, sexual coercion, and/or extortion based on inappropriate self-generated content. In one embodiment, the system automatically detects the harmful content and prevents the harmful content from being rendered or shown on the device, wherein the system is operable to blur the screen of the device when the user is attempting to display the harmful content. In one embodiment, the enforcement module blocks the harmful content by blurring the entire screen of the user device, placing visual graphics over the entire screen, blurring a portion of the screen of the user device that contains the harmful content, placing visual graphics over the specific region of harmful content, blocking the microphone, silencing the audio playing from the user device, stopping any video or multimedia from playing on the screen of the user device, displaying a warning message of harmful content, automatically shifting the camera away from the harmful content, displaying an option to learn more about why the content is harmful, shutting down the application on the user device, and/or shutting down the user device entirely. In one embodiment, the enforcement module is operable to mask the inappropriate content, wherein the enforcement module is operable to hide the inappropriate content until remedial action is taken by the user and/or the inappropriate content is no longer displayed. In one embodiment, the enforcement module is operable to substitute safe content in place of the inappropriate content. In one embodiment, the enforcement module is operable to display a message on the user device, wherein the message includes a warning of harmful and/or inappropriate content. In one embodiment, the enforcement module is operable to send a message to a third party when harmful and/or inappropriate content is displayed, wherein the message includes an alert of the harmful and/or inappropriate content. In one embodiment, the message is sent to a third party, including a parent, guardian, teacher, police, and/or any other individual or entity. In one embodiment, the enforcement module is operable to activate an alarm and/or siren on the user device when harmful and/or inappropriate content is displayed. Lastly, if the camera is pointed away from harmful content, the system is operable to revert to the camera functionality and display the content captured by the camera. In one embodiment, the system is operable to revert to the application functionality and display the application content once the inappropriate content has concluded, is exited, and/or is navigated away from. In one embodiment, the enforcement module is operable to provide mechanisms for a user to take a remedial action, including lifting a block and/or blur, to allow the deletion and/or navigation away from the harmful content. The system of the present invention prohibits a child or minor user from purposefully or accidentally filming, displaying, sending, and/or storing inappropriate or harmful images, videos, and/or audio of themselves on an application on a user device. In one embodiment, the enforcement module is software integrated into the ML model. In another embodiment, the enforcement module is standalone software wherein the ML model communicates with the enforcement module via an API.

In one embodiment, the system of the present invention is operable to monitor an application utilizing the camera of the user device in real-time, wherein the system is operable to detect, based on the training datasets, harmful content being captured by the camera of the user device. In one embodiment, the harmful content is self-generated inappropriate content, namely, nudity. The system is then operable to automatically block the harmful content from the screen and/or audio of the user device, such that the user of the device cannot see or hear the harmful content. In one embodiment, the system is operable to automatically block the harmful content from being uploaded and/or published to the application, including, but not limited to, live stream video broadcasts, photos, videos, audio, and/or any other multimedia content.

Figure 3:
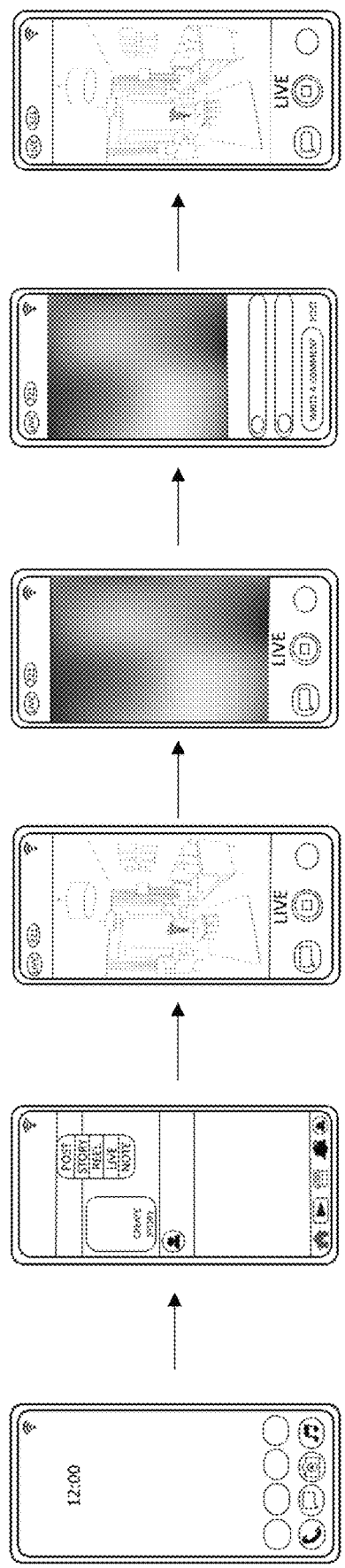
FIG. 3 illustrates a schematic diagram of the steps performed by a system for automatically blocking harmful content detected by a live camera during a live broadcast from a user device, according to one embodiment of the present invention.

In one embodiment, the system of the present invention includes the ML model and an enforcement module, wherein the ML model produces a classification of an event, and wherein the enforcement module is operable to act on the classification; for example, in one embodiment, the enforcement module is operable to automatically block harmful content detected by a live camera of a user device, during a live broadcast from a user device. FIG. 3 illustrates a schematic diagram of the steps performed by a system of the present invention for automatically blocking harmful content detected by a live camera during a live broadcast from a user device, generally described as 104, according to one embodiment of the present invention. In one embodiment, a device includes the system integrated into the operating system of the device. In one embodiment, a user opens an application that offers a live stream functionality, including but not limited to a social media application. In one embodiment, the application is a social media application, including but not limited to, FACEBOOK, INSTAGRAM, SNAPCHAT, TIKTOK, YOUTUBE, WHATSAPP, FACEBOOK MESSENGER, X (formerly TWITTER), BLUESKY, PINTEREST, THREADS, LINKEDIN, and/or ONLYFANS. In one embodiment, the application is a dating application, including but not limited to, BUMBLE, TINDER, HINGE, EHARMONY, and/or MATCH.COM. In one embodiment, the user begins a live stream video on the application from the user device, wherein the live stream video accesses the camera of the user device. In one embodiment, a user points the camera at harmless content, such as the environment the user is in, such as a living room. Then, a user points the camera at harmful content, including, but not limited to, nudity, violence, suicide, self-harm, harm to others, drugs, alcohol, bullying, crime, gore, terrorism, extremism, and/or hate speech, wherein the system automatically detects the harmful content and prevents the harmful content from being rendered or shown on the device, wherein the system is operable to blur the screen of the device when the user is attempting to display the harmful content. In one embodiment, the enforcement module blocks the harmful content by blurring the entire screen of the user device, placing visual graphics over the entire screen, blurring a portion of the screen of the user device that contains the harmful content, placing visual graphics over the specific region of harmful content, blocking the microphone, silencing the audio playing from the user device, stopping any video or multimedia from playing on the screen of the user device, displaying a warning message of harmful content, automatically shifting the camera away from the harmful content, displaying an option to learn more about why the content is harmful, shutting down the application on the user device, and/or shutting down the user device entirely. In one embodiment, the enforcement module is operable to mask the inappropriate content, wherein the enforcement module is operable to hide the inappropriate content until remedial action is taken by the user and/or the inappropriate content is no longer displayed. In one embodiment, the enforcement module is operable to substitute safe content in place of the inappropriate content. In one embodiment, the enforcement module is operable to display a message on the user device, wherein the message includes a warning of harmful and/or inappropriate content. In one embodiment, the enforcement module is operable to send a message to a third party when harmful and/or inappropriate content is displayed, wherein the message includes an alert of the harmful and/or inappropriate content. In one embodiment, the message is sent to a third party, including a parent, guardian, teacher, police, and/or any other individual or entity. In one embodiment, the enforcement module is operable to activate an alarm and/or siren on the user device when harmful and/or inappropriate content is displayed.

In one embodiment, any viewer watching the live stream will also be prevented from viewing the harmful content and a blurred screen will also appear and/or any of the foregoing actions will occur. Thus, both the streamer and the viewer are protected from viewing harmful content. In one embodiment, the enforcement module blocks the harmful content from viewers by blurring the entire screen of the user device, placing visual graphics over the entire screen, blurring a portion of the screen of the user device that contains the harmful content, placing visual graphics over the specific region of harmful content, blocking the microphone, silencing the audio playing from the user device, stopping any video or multimedia from playing on the screen of the user device, displaying a warning message of harmful content, automatically shifting the camera away from the harmful content, displaying an option to learn more about why the content is harmful, shutting down the application on the user device, and/or shutting down the user device entirely. Advantageously, the enforcement module of the present invention is operable to block or blur only harmful content while displaying the remainder of an image or video.

Lastly, if the camera is pointed away from harmful content, the system is operable to revert to the camera functionality and display the content captured by the camera. In one embodiment, the system is operable to revert to the application functionality and display the application content once the inappropriate content has concluded, is exited, and/or is navigated away from. In one embodiment, the enforcement module is operable to provide mechanisms for a user to take a remedial action, including lifting a block and/or blur, to allow the deletion and/or navigation away from the harmful content. The system of the present invention prohibits a child or minor user from purposefully or accidentally filming, displaying, sending, and/or storing inappropriate or harmful images, videos, and/or audio of themselves on a live stream video from an application on a user device.

In one embodiment, the application is a social media application, including but not limited to FACEBOOK, INSTAGRAM, SNAPCHAT, TIKTOK, YOUTUBE, WHATSAPP, GROUPME, FACEBOOK MESSENGER, X (formerly TWITTER), BLUESKY, PINTEREST, THREADS, LINKEDIN, and/or ONLYFANS. In one embodiment, the application is a video messaging and/or conferencing application, including, but not limited to, FACETIME, ZOOM, MICROSOFT TEAMS, GOOGLE MEET, CISCO WEBEX, SKYPE, and/or any other video messaging and/or conferencing application. In one embodiment, the application is a messaging application, including but not limited to a text messaging application embedded in the device (for example, MESSAGES for iOS), an embedded email application in the device (MAIL), GROUPME, WHATSAPP, GMAIL, FACEBOOK MESSENGER, SNAPCHAT, GOOGLE CHAT, DISCORD, YAHOO MAIL, MICROSOFT OUTLOOK, AOL MAIL, and/or any other type of messaging application. In one embodiment, the application is a dating application, including but not limited to, BUMBLE, TINDER, HINGE, EHARMONY, and/or MATCH.COM.

Figure 4:
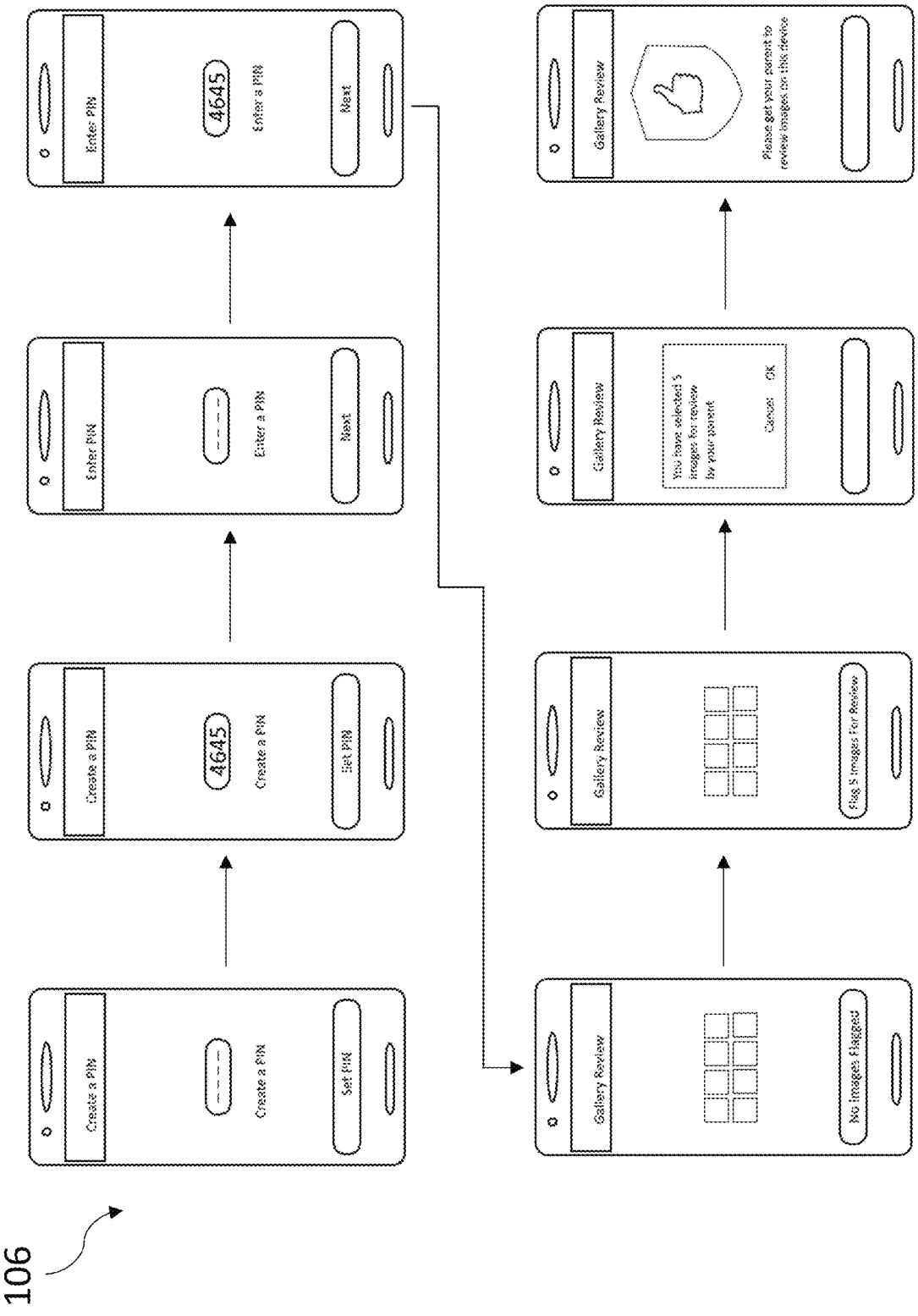
FIG. 4 illustrates a schematic diagram of the steps performed by a system for reporting content falsely flagged as harmful.

In one embodiment, the system of the present invention includes the ML model, wherein the ML model is operable to collect performance data and user feedback. In one embodiment, the system of the present invention is operable to include a gallery review section. FIG. 4 illustrates a schematic diagram of the steps performed by the system of the present invention for reporting content falsely flagged as harmful, generally described as 106. In one embodiment, the system of the present invention has detected harmful content within a user device's internal gallery and/or an application and quarantined that content. A user believes that the content has been wrongly classified as harmful. In one embodiment, the user must enter a password in order to unlock the quarantined content, wherein the quarantined content is password protected from being seen by any other user. Once the password has been entered and accepted, the quarantined gallery is unlocked and accessible. In one embodiment, the quarantined content is purposefully shrunk to a smaller size to prevent screenshots by the user and/or to prevent high resolution copies. The user selects the content they believe has been wrongly classified as harmful in order to flag the content for review by a parent and/or guardian. Once the user has selected the content for review, the user confirms their selection, and the content is sent to the flagged for review section of the system.

Figure 5:
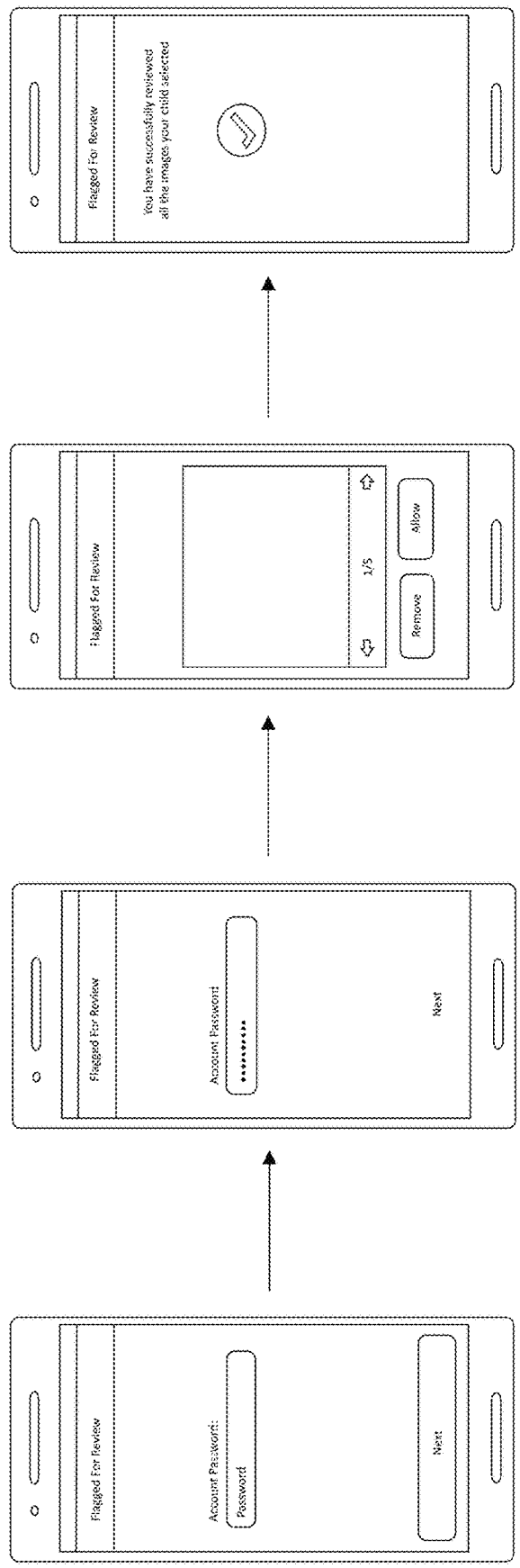
FIG. 5 illustrates a schematic diagram of the steps performed by a system for reviewing content flagged as harmful.

In one embodiment, the system of the present invention is operable to include a content flagged for review section. FIG. 5 illustrates a schematic diagram of the steps performed by the system of the present invention for reviewing content flagged as harmful, generally described as 108. In one embodiment, a user has selected blocked content for their parent and/or guardian to review for access, wherein the flagged for review content remains on the user device and is not sent outside beyond the user device. In one embodiment, content flagged for review is moved to a password protected area on the user device. In one embodiment, a parent and/or guardian must enter a password in order to unlock the flagged for review section of the system. Once the password is entered and accepted, the flagged for review section is unlocked and the parent and/or guardian gains access to the blocked content. In one embodiment, the parent and/or guardian can choose between at least two actions, including removing or allowing the content. In one embodiment, the removal action includes sending the content back to a blocked content gallery. In one embodiment, the allow action includes restoring the content in the device gallery and/or application the content originated in. Alternatively, the system of the present invention is operable to detect any type of content specified by the training dataset.

In one embodiment, the system is operable to automatically update for continuous improvement cycles and regulatory responsiveness. In one embodiment, the system is operable to automatically update over-the-air (OTA). In this embodiment, the system includes an OTA update module operable to securely download and deploy new weights within the ML model or policies without user intervention. In one embodiment, the system is operable to include rollback safeguards, such as fail-safes. In one embodiment, the OTA module is software integrated into the ML model. In another embodiment, the OTA module is standalone software wherein the ML model communicates with the OTA module via an API.

In an alternative embodiment, the system is operable to detect social unrest. For example, embedding the system into street and/or infrastructure cameras provides for automatic detection of street fighting, people carrying weapons such as guns or knives, and/or any other specific action as determined by the training dataset.

In an alternative embodiment, the system is operable to detect fighting between humans, namely between children at school. For example, embedding the system into school security cameras provides for automatic detection of a physical altercation between at least two children, wherein the system can further block any videos, photos, audio, and/or other multimedia content of the altercation from being published on the internet.

In an alternative embodiment, the system is operable to detect livestock. For example, embedding the system into farm and/or land security systems and/or cameras provides for automatic detection of events related to livestock, such as detecting livestock giving birth.

In another alternative embodiment, the system is operable to integrate into social media applications, providing for the social media administrator to prevent the uploading of harmful images, videos, audio, text, and/or any other multimedia content onto the social media platform.

The system is also operable to integrate into dating websites, applications, and/or platforms, providing for the administrator to prevent the uploading of harmful images, videos, audio, text, and/or any other multimedia content, onto the dating website, application, and/or platform. In one embodiment, the application is a dating application, including but not limited to, BUMBLE, TINDER, HINGE, EHARMONY, and/or MATCH.COM. In an alternative embodiment, the application is an application where users pay for adult entertainers to perform acts.

In another alternative embodiment, the system is operable to integrate into live news broadcasting services and/or platforms, wherein the system automatically detects and blocks harmful content from viewing screens, mutes the audio from playing on viewing devices, changes the channel, and/or turns off the device completely.

In an additional alternative embodiment, the system is operable to integrate into a streaming service, wherein the system automatically detects and blocks harmful content from the streaming service, including but not limited to, movies, television shows, live video broadcasts, music, audio, and/or any other content operable to be streamed from a streaming service. In one embodiment the streaming service is NETFLIX, HULU, DISNEY+, PARAMOUNT+, PEACOCK, APPLE TV, FUBO, DIRECTV STREAM, MAX (formerly HBOMAX), SLINGTV, YOUTUBE TV, ESPN+, STARZ, TUBI, DISCOVERY+, PLUTOTV, and/or any other streaming service.

In another alternative embodiment, the system is operable to integrate into a plurality of different cameras, wherein the system automatically detects and blocks harmful content from a live broadcast from a camera. For example, the system detects and determines a camera is filming and broadcasting a live war zone, and the system is operable to block the war zone content from being broadcasted.

In another alternative embodiment, the system is operable to detect and block harmful content within a live sporting event, wherein the system automatically detects and blocks the filming of harmful content at the live sporting event. In an additional alternative embodiment, the system is operable to detect and block harmful content within a live event, including a concert, wherein the system automatically detects and blocks the filming of harmful content at the live event.

In an alternative embodiment, the system is operable to integrate into video conferencing platforms, wherein the system automatically detects and blocks harmful content, both as the content is being recorded and/or being seen, and/or terminates the application from running. In one embodiment, the video conferencing platforms include, but are not limited to, FACETIME, ZOOM, MICROSOFT TEAMS, GOOGLE MEET, CISCO WEBEX, SKYPE, and/or any other video messaging and/or conferencing application.

The system is further operable to include facial recognition technology, wherein the system is operable to be trained to recognize specific individuals based on facial recognition. For example, the system detects and determines if a user of a device is the authorized user, and if the user is not the authorized user, the system is operable to lock the device and block any inputs by the unauthorized user.

In an alternative embodiment, the system is operable to automatically change the system settings and/or device settings on a user device. The system is operable to include profile settings, wherein a user specifies the settings for the user device within the user profile. In one embodiment, the system is operable to automatically change the system settings based on which user profile is selected. For example, when a child is using the device, the child's settings for the system of the present invention are more restricted than a parent's settings. When the parent wants to use the device, the parent selects their respective profile, and the system will automatically switch the settings to those of the parent.

In yet another alternative embodiment, the system is operable to integrate into a wearable device. In one embodiment, the wearable device includes at least one camera. In one embodiment, the system of the present invention is operable to prevent the wearable device from being accessed by an unauthorized person, based on facial recognition, as described above. In one embodiment, the system of the present invention is operable to prevent the recording of harmful content on the wearable device. In one embodiment, the wearable device, includes, but is not limited to, fitness trackers, smart jewelry, smart watches, a wearable camera, a head-mounted display, virtual reality (VR)/augmented reality (AR) headsets, smart glasses, smart clothing, and/or any other type of wearable device.

In an alternative embodiment, the system is operable to detect and prevent access to an age-restricted application, including a gambling application. In another alternative embodiment, the system is operable to hide the age-restricted application from being displayed on the device.

In an alternative embodiment, the system is operable to detect the existence or presence of deepfake, synthetic, and/or AI generated imagery, wherein the system is operable to distinguish the deepfake, synthetic, and/or AI generated imagery from real world content.

In an alternative embodiment, the system is operable to utilize geo-location technology. In one embodiment, the system is operable to utilize geo-location technology to determine the physical location of a device. In one embodiment, the system is operable to restrict an application and/or a device access based on the location of the device. For example, a device with a geolocation corresponding to a school could have the camera disabled by the system of the present invention while the device was at the school location. Additionally, for example, a device with a geolocation corresponding to a bathroom and/or changing room, could have the camera disabled by the system of the present invention while the device was at the location of the bathroom and/or changing room.

Figure 6:
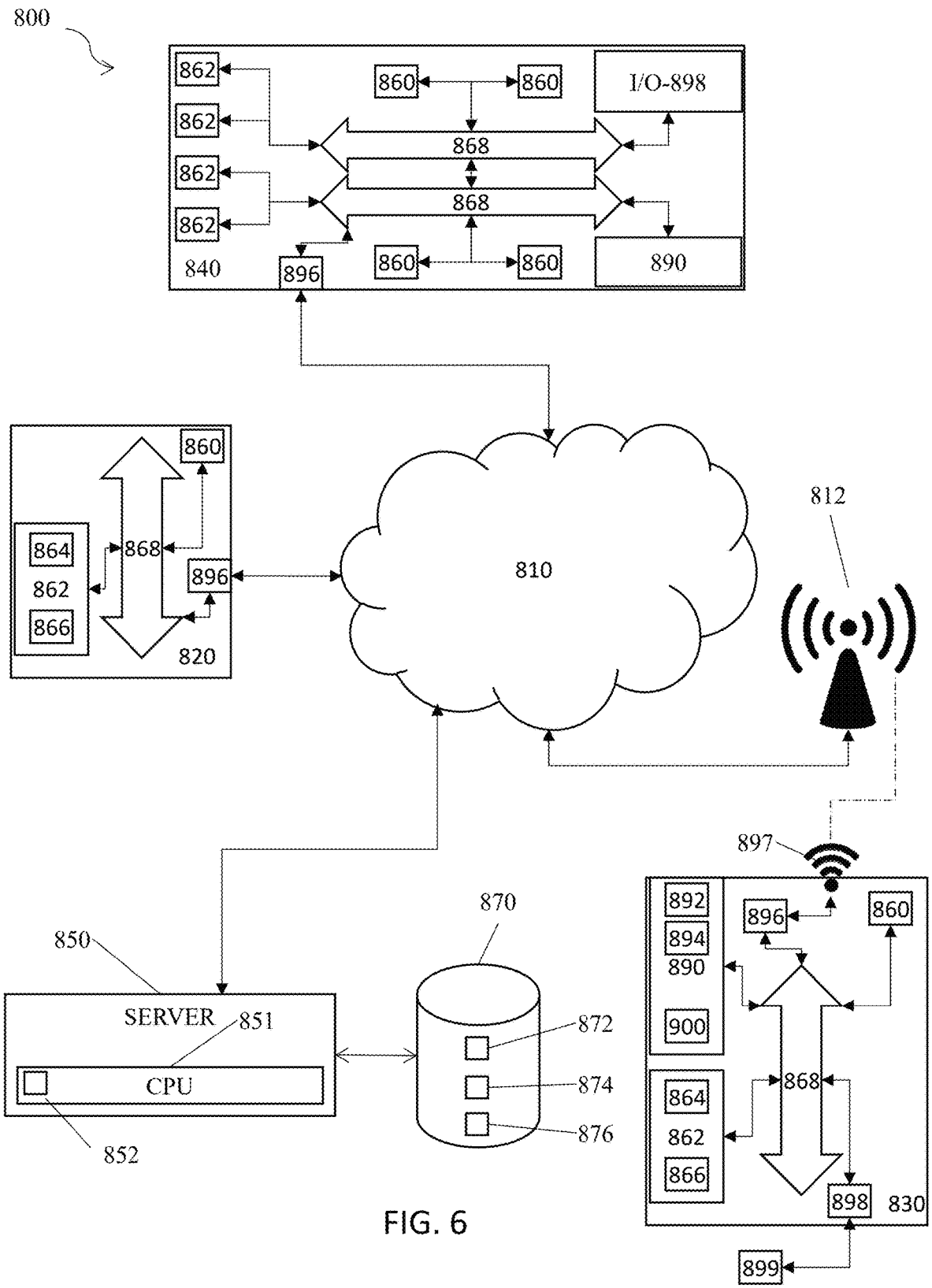
FIG. 6 is a schematic diagram of a system of the present invention.

FIG. 6 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, a gaming console, a wearable device, a smartphone, smartwatch, smart television, e-reader, digital camera, IoT device, smart home devices, VR/AR headsets, any device that uses a camera including, but not limited to a security camera and/or a baby monitoring device, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. ##, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 6, is operable to include other components that are not explicitly shown in FIG. 6 or is operable to utilize an architecture completely different than that shown in FIG. 6. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for automatic content detection and blocking on a user device, comprising:
   at least one computer processor including a memory;
   a machine learning (ML) model;
   an enforcement module; and
   a user device;
   wherein the ML model includes a neural network including a convolutional layer and/or a transformer layer configured for on-device inference;
   wherein the ML model is trained via standard classification loss, an adversarial robustness term, and a contrastive language-image pre-training (CLIP) based safety reward function;
   wherein the neural network includes an efficient vision transformer (EVT) architecture, and wherein the EVT architecture is operable to utilize structural reparameterization and reparameterizable convolutional token mixing;
   wherein the ML model is embedded into an operating system on the user device by at least one optimization technique, wherein the at least one optimization technique includes at least one of model compression, hardware acceleration, and/or code optimization;
   wherein the ML model is trained based on a dataset, wherein the dataset includes images, text descriptions, videos, audio, and/or any other multimedia content;
   wherein the ML model is operable to automatically detect content displayed on a screen of the user device;
   wherein the ML model is operable to conduct a frame-by-frame pixel differentiation comparison;
   wherein the ML model is operable to automatically determine whether the content includes one or more restricted categories of material; and
   wherein the enforcement module is operable to select between full-frame blocking and regional masking of the content that includes one or more restricted categories of material from being displayed on the screen of the user device.

2. The system of claim 1, wherein the EVT architecture includes an image encoder with a text decoder, wherein the image encoder is trained on image-text pair datasets, wherein the image encoder is operable to compare image features to predefined prompt embeddings.

3. The system of claim 1, wherein the restricted categories of material include child sexual abuse material (CSAM), not safe for work (NSFW) content, and/or inappropriate self-generated content, wherein the inappropriate self-generated content is inappropriate content generated by a user of the user device.

4. The system of claim 1, wherein the dataset is enriched by generative adversarial network (GAN)-based augmentation, wherein the GAN-based augmentation generates synthetic images or videos which mimic real-world images or videos, including noise patterns, motion blur, low-light conditions, and/or occlusion.

5. The system of claim 1, wherein the ML model includes region of interest (ROI) filtering, wherein the ROI filtering is operable to analyze and filter specific regions within the content.

6. The system of claim 1, wherein the ML model includes low-rank adaptation (LoRA), wherein the LoRA is operable to adjust the ML model based on instruction sets.

7. The system of claim 1, wherein the ML model is operable to analyze local storage of the user device, and wherein the enforcement module is operable to automatically quarantine, delete, or encrypt restricted content in the local storage of the user device.

8. The system of claim 1, wherein the user device is a smartphone, a laptop, a tablet, a smartwatch, a smart television, a gaming console, an e-reader, a digital camera, an internet of things device, a wearable device, a smart home device, a virtual reality headset, an augmented reality headset, a security camera, and/or a baby monitoring device.

9. The system of claim 1, wherein the neural network includes layers operable to provide provable adversarial robustness guarantees.

10. The system of claim 1, wherein the content displayed on the screen of the user device includes content simultaneously captured from a plurality of cameras on the user device.

11. A method for automatic content detection and blocking, comprising:
- at least one computer processor including a memory;
- a machine learning (ML) model built on efficient vision transformer (EVT) architecture;
- an enforcement module; and
- a user device;
- training the ML model via standard classification loss, an adversarial robustness term, and a contrastive language-image pre-training (CLIP) based safety reward function;
- utilizing, by the EVT architecture, structural reparameterization and reparameterizable convolutional token mixing;
- embedding the ML model into an operating system on the user device by at least one optimization technique, wherein the at least one optimization technique includes at least one of model compression, hardware acceleration, and/or code optimization;
- training the ML model based on a dataset, wherein the dataset includes images, text descriptions, videos, audio and/or any other multimedia content;
- automatically detecting content displayed on a screen of the user device;
- automatically conducting a frame-by-frame pixel differentiation comparison;
- automatically determining whether the content includes one or more restricted categories of material; and
- automatically blocking portions of content that include one or more restricted categories of material from being displayed on the screen of the user device without blocking all the content.

12. The method of claim 11, further comprising implementing region of interest (ROI) filtering into the ML model, wherein the ML model is operable to analyze and filter specific regions within the content based on the ROI filtering.

13. The method of claim 11, further comprising implementing low-rank adaptation (LoRA) to adjust the ML model based on instruction sets.

14. The method of claim 11, further comprising an image encoder with a text decoder in the EVT architecture, wherein the image encoder is trained on image-text pair datasets, wherein the image encoder is operable to compare image features of the content to predefined prompt embeddings.

15. The method of claim 11, further comprising enriching the dataset by generative adversarial network (GAN)-based augmentation, wherein the GAN-based augmentation generates synthetic images or videos that mimic real-world images or videos, including, noise patterns, motion blur, low-light conditions, and/or occlusion.

16. The method of claim 11, wherein the restricted categories of material include child sexual abuse material (CSAM), not safe for work (NSFW) content, and/or inappropriate self-generated content, wherein the inappropriate self-generated content is inappropriate content generated by a user of the user device.

17. A system for automatic content detection and blocking on a user device, comprising:
- a computer processor including a memory;
- a machine learning (ML) model;
- an enforcement module; and
- a user device;
- wherein the ML model includes a neural network including a convolutional layer and/or a transformer layer configured for on-device inference;
- wherein the ML model is trained via standard classification loss, an adversarial robustness term, and a contrastive language-image pre-training (CLIP) based safety reward function;
- wherein the neural network includes efficient vision transformer (EVT) architecture, and wherein the EVT architecture is operable to utilize structural reparameterization and reparameterizable convolutional token mixing;
- wherein the ML model is embedded into an operating system on the user device by at least one optimization technique, wherein the at least one optimization technique includes at least one of model compression, hardware acceleration, and/or code optimization;
- wherein the ML model is trained based on a dataset, wherein the dataset includes images, text descriptions, videos, audio and/or any other multimedia content;
- wherein the ML model is operable to automatically detect content captured by a live camera of the user device;
- wherein the ML model is operable to conduct a frame-by-frame pixel differentiation comparison between consecutive frames;
- wherein the ML model is operable to automatically determine whether the content includes one or more restricted categories of material; and
- wherein the enforcement module is operable to selectively apply regional masking and/or full-frame blocking of content that includes one or more restricted categories of material from being captured by the live camera of the user device.

18. The system of claim 17, wherein the content captured by the camera of the user device is livestreamed through an application on the user device.

19. The system of claim 17, wherein the system is operable to intercept and process camera data and/or application data, and wherein the system is operable to modify the intercepted camera and/or application data before transmitting the camera data and/or application data to a second user device.

20. The system of claim 17, wherein the EVT architecture includes an image encoder with a text decoder, wherein the image encoder is trained on image-text pair datasets, wherein the image encoder is operable to compare image features to predefined prompt embeddings.

21. The system of claim 17, wherein the restricted categories of material include child sexual abuse material (CSAM), not safe for work (NSFW) content, and/or inappropriate self-generated content, wherein the inappropriate self-generated content is inappropriate content generated by a user of the user device.

22. The system of claim 17, further comprising an over-the-air update module operable to securely download and deploy updates.

23. The system of claim 17, wherein the ML model includes a temporal smoothing mechanism.

24. The system of claim 17, wherein the enforcement module is operable to block multiple content streams simultaneously.

\* \* \* \* \*